US012165219B1

(12) United States Patent
Chan

(10) Patent No.: US 12,165,219 B1
(45) Date of Patent: *Dec. 10, 2024

(54) AUTOMATED SYSTEMS AND METHODS FOR AN ELECTRONIC LEDGER

(71) Applicant: Avalara, Inc., Seattle, WA (US)

(72) Inventor: Andrew Brandon Chan, Chapel Hill, NC (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,741

(22) Filed: Jul. 13, 2023

Related U.S. Application Data

(63) Continuation of application No. 17/028,916, filed on Sep. 22, 2020, now Pat. No. 11,810,205.

(Continued)

(51) Int. Cl.
  *G06Q 20/00*  (2012.01)
  *G06F 9/451*  (2018.01)
  (Continued)

(52) U.S. Cl.
  CPC ........... *G06Q 40/123* (2013.12); *G06F 9/451* (2018.02); *G06F 16/27* (2019.01); *G06Q 20/02* (2013.01);
  (Continued)

(58) Field of Classification Search
  CPC .. G06Q 40/123; G06Q 20/02; G06Q 20/3825; G06Q 20/3827; G06Q 20/389;
  (Continued)

(56) References Cited

U.S. PATENT DOCUMENTS 7,249,072 B1    7/2007  Nearhood et al.
7,783,536 B2    8/2010  William et al.
(Continued)

OTHER PUBLICATIONS

Bucks, Dan R., "Airbnb Agreements with State and Local Tax Agencies—A Formula for Undermining Tax Fairness, Transparency, and the Rule of Law," Mar. 2017, 55 pages.

(Continued)

*Primary Examiner* — Dante Ravetti
(74) *Attorney, Agent, or Firm* — Jeremiah J. Baunach; Frontier IP Law PLLC

(57) ABSTRACT

Automated systems and methods for a secure electronic ledger provide a technical solution such that entities referencing the electronic ledger that are associated with a relationship instance can (a) form a consensus that the outcome of the relationship instance is legitimate and (b) determine whether future relationship instances between entities are compliant. An authority entity publishes to the secure electronic ledger data on which digital rules regarding aspects of the relationship instance between a first entity and second entity are based. Entities subscribed to the secure electronic ledger make digitally signed entries in real-time in the secure electronic ledger including data regarding the relationship instance that are visible by all entities associated with the relationship instance. A trusted third entity is electronically entrusted, by at least the system of the first entity and a system of an authority entity, to validate in real-time the data regarding the relationship instance contained in the entries and all such entries may be approved or rejected in real-time by one or more entities associated with the relationship instance. The approvals and rejections of the entries in the secure electronic ledger, and reasons therefor, are also recorded and visible in the secure electronic ledger to all entities associated with the transaction.

13 Claims, 12 Drawing Sheets

Related U.S. Application Data

(60) Provisional application No. 63/039,907, filed on Jun. 16, 2020, provisional application No. 63/039,906, filed on Jun. 16, 2020, provisional application No. 63/039,903, filed on Jun. 16, 2020, provisional application No. 62/990,789, filed on Mar. 17, 2020.

(51) Int. Cl.

| | | |
|---|---|---|
| *G06F 16/27* | (2019.01) | |
| *G06Q 20/02* | (2012.01) | |
| *G06Q 20/38* | (2012.01) | |
| *G06Q 20/40* | (2012.01) | |
| *G06Q 30/018* | (2023.01) | |
| *G06Q 40/04* | (2012.01) | |
| *G06Q 40/10* | (2023.01) | |
| *G06Q 40/12* | (2023.01) | |
| *G06Q 50/00* | (2012.01) | |
| *H04L 9/06* | (2006.01) | |
| *H04L 9/32* | (2006.01) | |
| *H04L 9/40* | (2022.01) | |
| *G06Q 30/0645* | (2023.01) | |
| *G06Q 50/12* | (2012.01) | |
| *G06Q 50/26* | (2012.01) | |

(52) U.S. Cl.
CPC ..... *G06Q 20/3825* (2013.01); *G06Q 20/3827* (2013.01); *G06Q 20/389* (2013.01); *G06Q 20/401* (2013.01); *G06Q 20/405* (2013.01); *G06Q 30/0185* (2013.01); *G06Q 40/04* (2013.01); *G06Q 40/10* (2013.01); *G06Q 50/01* (2013.01); *H04L 9/0637* (2013.01); *H04L 9/3247* (2013.01); *H04L 63/102* (2013.01); *G06Q 30/0645* (2013.01); *G06Q 50/12* (2013.01); *G06Q 50/26* (2013.01); *G06Q 2220/00* (2013.01)

(58) Field of Classification Search
CPC ............... G06Q 20/401; G06Q 20/405; G06Q 30/0185; G06Q 40/04; G06Q 40/10; G06Q 50/01; G06Q 30/0645; G06Q 50/12; G06Q 50/26; G06Q 2220/00; G06F 9/451; G06F 16/27; H04L 9/0637; H04L 9/3247; H04L 63/102

USPC .......................... 705/16, 21, 59; 380/44, 262
See application file for complete search history.

(56) References Cited

U.S. PATENT DOCUMENTS

| | | |
|---|---|---|
| 7,933,803 B1 | 4/2011 | Nadler et al. |
| 8,620,578 B1 | 12/2013 | Brown et al. |
| 8,725,407 B2 | 5/2014 | Hurley et al. |
| 9,760,915 B2 | 9/2017 | Pavlou et al. |
| 10,445,818 B1 | 10/2019 | Chowdhary |
| 10,719,842 B1 | 7/2020 | Gharavy |
| 10,769,611 B2 | 9/2020 | McNeel |
| 11,798,007 B1 | 10/2023 | Maselli et al. |
| 2002/0052792 A1 | 5/2002 | Johnson et al. |
| 2002/0138765 A1 | 9/2002 | Fishman et al. |
| 2002/0188535 A1 | 12/2002 | Chao et al. |
| 2005/0071246 A1 | 3/2005 | Smith et al. |
| 2007/0136158 A1 | 6/2007 | Rawlings et al. |
| 2007/0136159 A1 | 6/2007 | Rawlings et al. |
| 2008/0120129 A1* | 5/2008 | Seubert ............... G06Q 40/125 705/305 |
| 2009/0119193 A1 | 5/2009 | Selleck |
| 2009/0240541 A1 | 9/2009 | Smith |
| 2010/0306071 A1 | 12/2010 | Kay |
| 2011/0066455 A1 | 3/2011 | Lobo et al. |
| 2012/0030045 A1 | 2/2012 | Smith, III |
| 2012/0197759 A1 | 8/2012 | Neely et al. |
| 2013/0013471 A1 | 1/2013 | Fishman |
| 2013/0317942 A1 | 11/2013 | Cullen, III |
| 2014/0337180 A1 | 11/2014 | Dvorak et al. |
| 2014/0337189 A1 | 11/2014 | Barsade et al. |
| 2014/0379531 A1 | 12/2014 | Huang et al. |
| 2017/0011377 A1 | 1/2017 | Stone |
| 2018/0268420 A1 | 9/2018 | Maselli et al. |
| 2019/0340703 A1 | 11/2019 | West et al. |
| 2020/0042964 A1 | 2/2020 | Roach et al. |
| 2021/0049552 A1 | 2/2021 | Dolan et al. |
| 2021/0233181 A1 | 7/2021 | Bubalo et al. |

OTHER PUBLICATIONS

Avalara for beverage alcohol now features shipping verification, providing real-time compliance for direct-to-consumer sellers. (Apr. 21, 2021). (Year: 2021).

\* cited by examiner

ENTRY A

| ENTRY ID | ENTITY ID | ENTRY TYPE | ENTRY CONTENT | RELATIONSHIP INSTANCE ID | ADDITIONAL DATA | DIGITAL SIGNATURE INDICATOR | ENTRY STATUS |
|---|---|---|---|---|---|---|---|
| 202 | 204 | 206 | 208 | 210 | 212 | 214 | 216 |

FIG. 2

AUTOMATED SYSTEMS AND METHODS FOR AN ELECTRONIC LEDGER

TECHNICAL FIELD

The technical field relates to operation of computers and computer networks, and particularly to networked automated systems for an electronic ledger.

BRIEF SUMMARY

The present description gives instances of computer systems, devices and storage media that may store programs and methods. Embodiments of the system provide a secure electronic ledger to which an authority entity publishes data on which digital rules regarding aspects of a relationship instance between a first entity and second entity are based. Entities subscribed to the secure electronic ledger communicate via systems on a computer network and may make digitally signed entries in real-time in the secure electronic ledger over the network including data regarding the relationship instance, such as, for example, amounts of resources received. The digitally signed entries are visible by all entities subscribed to the electronic ledger that are associated with the relationship instance. A trusted third entity is electronically entrusted, by at least the system of the first entity and a system of the authority entity, to validate in real-time the data regarding the relationship instance contained in the entries. All such entries in the electronic ledger may be approved or rejected in real-time by one or more entities associated with the relationship instance. The approvals and rejections of the entries in the secure electronic ledger, and reasons therefor, are also recorded and made visible in the secure electronic ledger to all entities associated with the relationship instance.

Thus, the systems and methods described herein for an electronic ledger improve computer networks and the operation of computerized systems by facilitating electronic verification in real-time that correct amounts of resources are received by respective systems on the network of one or more of the first entity and the authority entity based on the relationship instance and entries in the secure electronic ledger regarding the relationship instance.

Providing, in a timely and efficient manner, accurate and reliable verification in real-time that correct amounts of resources are received by respective systems on the network presents a technical problem for current Enterprise Resource Planning (ERP) software applications. This problem is exacerbated when multiple different digital rules must be applied to the same data associated with a particular relationship instance in order to remit resources to multiple different entities associated with the particular relationship instance.

The present disclosure provides systems, devices, computer-readable media and methods that solve these technical problems by increasing the speed, efficiency (including processing and memory usage efficiency) and accuracy of such specialized software platforms and computer networks, thus improving the technology of ERP software applications and accounting applications.

Therefore, the automated systems and methods described herein for an electronic ledger improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and to existing computerized systems to facilitate allocation and remitting of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 2 is a diagram of an example entry in an electronic ledger, according to embodiments of the present disclosure that comprise improvements in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
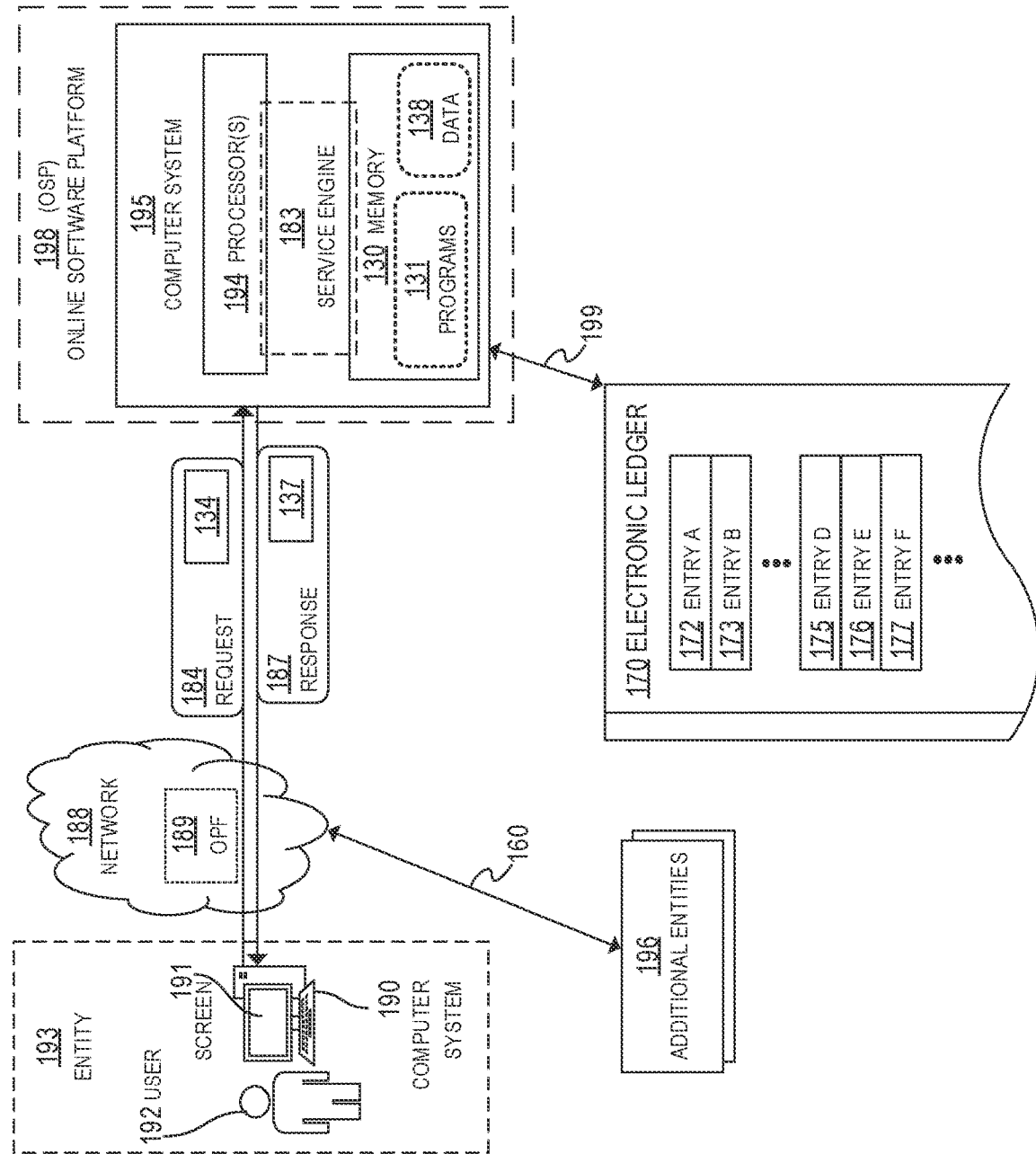
FIG. 1 is a diagram showing sample aspects of embodiments of the present disclosure that comprise improvements in automated computerized systems.

FIG. 1 is a diagram showing sample aspects of embodiments of the present disclosure.

Shown is a sample computer system 195 according to various embodiments. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be searches, determinations, computations, verifications, notifications, the implementation of and providing access to an electronic ledger as described herein (e.g., electronic ledger 170), the transmission of specialized information, including data that effectuates payments or remits resources, the generation and transmission of documents, the online accessing of other systems to effect registrations and licensing, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of an entity 193. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules stored in memory 130 to the payload 134 to make an entry related to the payload 134 into the electronic ledger 170, retrieve information related to the payload 134 from the electronic ledger 170, validate information entered or submitted for entry in the electronic ledger 170, record approvals or rejections from the entity 193 and additional entities 196 of entries in the electronic ledger 170 and/or determine a requested resource, which may also be based on entries in the electronic ledger 170. The service engine 183 may form a payload 137, and then push, send, or otherwise cause to be transmitted a response 187 that carries the payload 137 to the connector. The connector reads the response 187, and forwards the payload 137 to the certain application. For example, the payload 137 may include information retrieved from the electronic ledger 170, information that is an aspect of the resource and/or information that is otherwise related to one or more entries (e.g., entry A 172, entry B 173 . . . entry D 175, entry E 176, entry F 177 . . . ) of the electronic ledger 170.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 makes one or more entries related to the payload 134 into the electronic ledger 170, retrieves information related to the payload 134 from the electronic ledger 170, validates information entered or submitted for entry in the electronic ledger 170, records approval or rejections from the entity 193 and additional entities 196 of entries in the electronic ledger 170, and/or determines a requested resource based on such entries in the electronic ledger 170, and then sends an aspect of such information back to the REST API. In turn, the REST API sends the response 187 that has the payload 137 to the particular application. For example, programs 131 may include programs that perform such functions related to the electronic ledger 170 and data 138 may include data that comprises entries (e.g., entry A 172, entry B 173 . . . entry D 175, entry E 176, entry F 177 . . . ) of the electronic ledger 170 and other received and/or generated data related to the electronic ledger 170, such as payload 134 and/or payload 137.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the entity 193 may have instances of relationships with additional entities 196. A large number of additional entities 196 may be present in various embodiments. In some embodiments, one or more of the additional entities 196 do not have any instances of relationships with entity 193, but may instead have instances of relationships with one or more other entities of additional entities 196. The communication 160 between the additional entities 196, entity 193, OPF 189 and OSP 198 may be made over network 188. One or more of the additional entities 196 may communicate and obtain the services of the OSP 198 in the same or similar manner as that of entity 193 as described herein. For example, one or more additional entities 196 may have a relationship instance with entity 193. On behalf of or in response to a request from a particular entity of additional entities 196, the service engine 183 may make one or more entries related to the relationship instance into the electronic ledger 170, retrieve information related to the relationship instance from the electronic ledger 170, validate or otherwise verify information entered or submitted by the particular entity for entry in the electronic ledger 170, record approval or rejections from the entity 193 and additional entities 196 of entries in the electronic ledger 170, determine a requested resource based on such entries in the electronic ledger 170, and/or remit a requested resource to one or more additional entities 196 based on such entries in the electronic ledger 170. In the example embodiment, the OSP 198 performs such operations involving the electronic ledger 170, such as editing, updating, retrieving information from and managing the electronic ledger 170, via communication 199.

In some embodiments, the computer system 195 communicates with, operates and otherwise interacts with the electronic ledger 170 using the same or similar request and response protocol and methods described herein that the computer system 195 uses to interact with computer system 190. In some embodiments the electronic ledger 170 comprises a database located and/or managed locally by computer system 195. In other embodiments, the electronic ledger 170 is located and/or managed by the computer system 195 remotely, such as via network 188. For example, one or more aspects of the electronic ledger 170 may be stored and/or managed in the OPF 189. In the present example, the OSP 198 manages, administers, operates, and audits the electronic ledger 170.

The entity 193 and/or additional entities 196 may electronically subscribe to services of the OSP 198 including, for example, to electronically use the electronic ledger 170 to facilitate relationship instances and proper outcomes of such relationship instances between such entities. In an example embodiment, the service engine 183 may electronically make all entries in the in the electronic ledger 170 associated with a particular relationship instance remotely visible by all subscribers of the electronic ledger 170 associated with the particular relationship instance. For example, entry A 172 and entry B 173 may be associated with a particular relationship instance between entity 193 and one or more additional entities 196. Following this example, entry A 172 may have been made in the electronic ledger 170 via OSP 198 by entity 193 and entry B 172 may have been made via OSP 198 by a particular entity of additional entities 196 that has a relationship instance with entity 193. OSP 198 will make entry A 172 and entry B 173 visible, over network 188, to entity 193 and one or more additional entities 196 associated with that relationship instance.

Also, in some embodiments, for each relationship instance, the service engine 183 may provide to subscribers of the electronic ledger 170 associated with the relationship instance an ability to electronically enter in the electronic ledger 170 a rejection or approval of any and all entries in the electronic ledger 170 that are associated with the relationship instance, regardless of the entity that made the entry in the electronic ledger 170 via OSP 198. In this manner, a technical solution is provided such that entities referencing the electronic ledger 170 that are associated with the relationship instance can (a) form a consensus that the outcome of the relationship instance is legitimate and (b) determine whether future relationship instances between such entities are compliant.

In some embodiments, OSP 198 may be provided by a trusted third entity that is electronically entrusted, by at least the system of entity 193 and a system of an authority entity (which may be one of the additional entities 196) to validate the data regarding the relationship instance. In this case, the system of the authority entity provides a first set of data on which digital rules regarding aspects of the relationship instance are based. This first set of data may be published to the electronic ledger 170 by the authority entity making entries in the electronic ledger 170 including such data on which digital rules regarding aspects of the relationship instance are based. Service engine 183 may also perform other operations, such as determine a particular resource associated with the relationship instance according to the entries in the electronic ledger 170 associated with the relationship instance and the associated digital rules that are based on the first set of data published to the electronic ledger 170.

FIG. 2 is a diagram of an example entry in an electronic ledger, such as entry A 172 in electronic ledger 170 of FIG. 1, according to embodiments of the present disclosure that comprise improvements in automated computerized systems. In some embodiments, the example entry shown in FIG. 2 may be representative of all entries on the electronic ledger 170. In various other embodiments, entries in electronic ledger 170 may have fewer or additional types of data that comprise the entry. In the present example, entry A 172 A includes an entry ID 202, which is a unique identifier that distinguishes the entry from other entries in the electronic ledger 170. Also included in an entity ID 204 that uniquely identifies the entity that made the entry or that is otherwise associated with the entry.

Entry A 172 A may also include an entry type 206 that indicates a type of entry that entry A 172 is. What the entry type 206 is may in some cases depend on, be according to, or otherwise be related to, the entry content 208. For example, the entry content may be, but is not limited to: an amount of resource, a description, data related to an entity, data related to a relationship instance, a rule (e.g., a digital rule or human readable rule), a rate, an electronic document, an approval, a rejection, a characteristic of a relationship instance, metadata regarding a relationship instance, etc. Entry A 172 A may also include a relationship instance ID 210 that identifies a particular relationship instance with which entry A 172 A is associated. For example, the value of relationship instance ID 210 may determine which entities entry A 172 is visible to, such that only entities associated with the relationship instance identified by the relationship instance ID 210 can see (and possibly reject or approve) entry A 172. Additional data 212 may also be included in entry A 172, including, but not limited to: data that indicates which applicable entities must approve entry A 172 in order for entry A 172 to be approved or marked complete (e.g., in entry status 216); data indicative of whether the associated relationship instance identified by relationship instance ID 210 is complete; data that facilitates management of the electronic ledger 170; metadata that describes or is related to the entry content 208; metadata that describes or is related the relationship instance identified by the relationship instance ID 210; and metadata that describes or is related to one or more entities associated with the relationship instance identified by the relationship instance ID 210, etc.

To implement a secure electronic ledger, each entry in the electronic ledger 170, such as entry A 172, may be digitally signed by the entity making the entry using a cryptographic hash or protocol, or other digital signature technique. For example, the digital signature of entry A 172, an indication of the digital signature, or an indication that the entry has been digitally signed, may be included as the digital signal indicator 214. In this manner, it may be verified and authenticated that entry A 172 was made by the entity identified by the entity ID 204.

Entry A 172 may also include entry status 216, which indicates a status of the entry, for example, whether the entry has been approved, is pending approval or is rejected. In some embodiments, according to digital rules implemented by the service engine 183 (which may also be based on data published to the electronic ledger 170), for a relationship instance to be complete or for the relationship instance to proceed to another stage or level, some or all of the entries in the electronic ledger 170 associated with that relationship instance must be approved by all the entities subscribing to the electronic ledger 170 that are associated with that relationship instance. Such approval for each entry may be indicated by an entry status of the entry, such as entry status 216 for entry A 172.

For example, entry status 216 for entry A 172 may indicate the entry is pending approval until the entry content 208 of entry A 172 has been approved by all applicable entities associated with the relationship instance identified by relationship instance ID 210. The entry status 216 for entry A 172 may indicate the entry is rejected when the entry is rejected by any one of the applicable entities associated with the relationship instance identified by relationship instance ID 210. In some embodiments, the entry status 216 may include a plurality of values indicating different states the entry A 172 is currently in. For example, the entry status 216 may indicate a status of rejected, approved or pending approval for each applicable entity associated with the relationship instance identified by relationship instance ID 210. Once each applicable entity associated with the relationship instance identified by relationship instance ID 210 indicates, via the service engine 183, that entry A 172 is approved, the entry status 216 may be changed to an overall approved status indicating the entry has been approved by all applicable entities associated with the relationship instance identified by relationship instance ID 210.

In some embodiments, once all such entries in the electronic ledger 170 associated with the relationship instance identified by relationship instance ID 210 are in an overall approved status, this may trigger the service engine 183 to indicate or allow the applicable relationship instance to be marked complete or to proceed to another stage or level, which may in turn allow or trigger additional actions by the service engine 183 to occur, such as determining or remitting a resource amount and/or submitting electronic documents to various entities. The status of the relationship instance identified by relationship instance ID 210 being complete or being able to proceed to another stage or level may also be indicated by the entry status 216 and/or in the additional data 212.

In various embodiments, the date and time of each change in the electronic ledger 170 and change of data of an entry in the electronic ledger 170 (e.g., a date and time entry A 172 was made, a date and time of a change in the entry status 216, etc.) may be recorded as part of additional data 212. Also, such changes and associated dates and times may be communicated in real-time to all applicable entities subscribed to the electronic ledger 170 that are associated with the particular relationship instance. For example, when entry A 172 is made and when a change to entry status 216 occurs, service engine 183 may automatically send a communication indicating what was changed and the date and time the change occurred, via network 188, to all entities subscribed to the electronic ledger 170 that are associated with the relationship instance ID 210. This improves the efficiency and reliability of computerized verification and resource determination systems by enabling the OSP 198 to validate, in real-time, the accuracy of information submitted by various entities, such as entity 193 and one or more additional entities 196, associated with a relationship instance and to validate the remittance of resources, rates and other information published by various entities associated with the relationship instance. Thus, all entities subscribed to the electronic ledger 170 that are associated with the relationship instance ID 210 can form a consensus that the outcome of the relationship instance is legitimate and determine whether future relationship instances between the applicable entities are compliant.

In some embodiments, an entry in the electronic ledger 170 may be an approval or rejection of another entry in the electronic ledger 170. For example, the entry content 208 may include data indicative of an approval or rejection of another entry in the electronic ledger 170. In such embodiments, it may be that if entry A 172 is an approval of another entry in the electronic ledger 170, it need not itself be approved by another entity associated with the relationship instance identified by relationship instance ID 210 for that relationship instance to be to be marked complete or to proceed to another stage or level once all entities associated with that relationship instance also indicate approval of that other entry. Also, in some embodiments, for an entry to be entered into the electronic ledger 170 (or into portion of the electronic ledger reserved for approved entries), the submitted entry must first be approved by all entities subscribed to the electronic ledger 170 that are associated with the relationship instance identified by the submitted entry.

Figure 3:
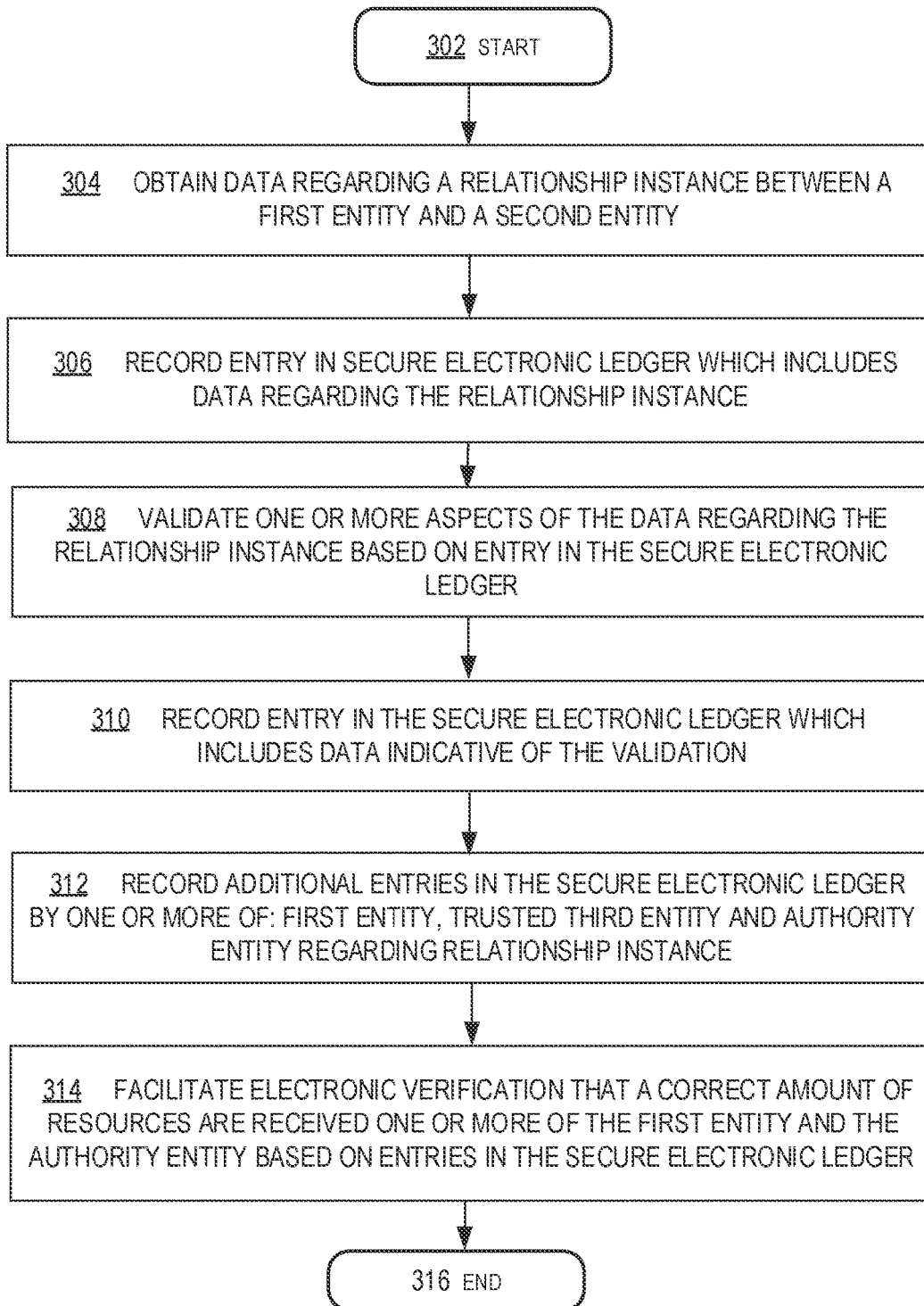
FIG. 3 is a flowchart for illustrating sample methods, according to embodiments of the present disclosure that comprise improvements in automated computerized systems.

FIG. 3 is a flowchart for illustrating sample methods, according to embodiments of the present disclosure that comprise improvements in automated computerized systems.

In the present example, method 300 starts at 302.

At 304, the OSP 198 electronically obtains data regarding a relationship instance between a first entity and a second entity. For example, the first entity may be entity 193 of FIG. 1 and the second entity may be one of the additional entities 196. The OSP 198 may be that of (or provided by) a trusted third entity that is electronically entrusted, by at least the system of the first entity and a system of an authority entity, to validate the data regarding the relationship instance. The authority entity may, for example, be one of the additional entities 196 of FIG. 1 and may provide a first set of data on which digital rules regarding aspects of the relationship instance are based.

At 306, the OSP 198 electronically records an entry in a secure electronic ledger, such as electronic ledger 170, which includes the data regarding the relationship instance and a digital signature by the first entity of the entry including the data regarding the relationship instance.

At 308, the OSP 198 electronically validates one or more aspects of the data regarding the relationship instance based on the entry in the secure electronic ledger which includes the data regarding the relationship instance.

At 310, the OSP 198 electronically records an entry in the secure electronic ledger which includes data indicative of the validation of the one or more aspects of the data regarding the relationship instance and a digital signature by the trusted third entity of the entry including the data indicative of the validation of the one or more aspects of the data regarding the relationship instance.

At 312, the OSP 198 electronically records additional entries in the secure electronic ledger by one or more of the first entity, the trusted third entity and the authority entity, which include data indicative of whether one or more other entries in the secure electronic ledger regarding the relationship instance are approved by the one or more of the first entity, the trusted third entity and the authority entity.

At 314, the OSP 198 electronically facilitates electronic verification that a correct amount of resources are received by respective systems of one or more of the first entity and the authority entity based on the relationship instance and entries in the secure electronic ledger regarding the relationship instance.

In various embodiments, the OSP 198 may also electronically obtain, from a system of an intermediary entity that facilitates the relationship instance, additional data regarding the relationship instance. The intermediary entity may, for example, be one of the additional entities 196 of FIG. 1. The OSP 198 will then also electronically record an entry in the secure electronic ledger which includes the additional data regarding the relationship instance and a digital signature by the intermediary entity of the entry which includes the additional data regarding the relationship instance. The additional entries in the secure electronic ledger include one or more entries electronically signed by the intermediary entity regarding the relationship instance. The electronic facilitation of the electronic verification that a correct amount of resources are received by respective systems of one or more of the first entity and the authority entity is then also based on the relationship instance and entries in the secure electronic ledger regarding the relationship instance including the one or more electronic entries electronically signed by the intermediary entity.

The OSP 198 may also electronically obtain, from the system of the intermediary entity, a second set of data on which the digital rules regarding aspects of the relationship instance are based. The OSP 198 will then electronically record an entry in the secure electronic ledger which includes the second set of data and a digital signature by the intermediary entity of the entry which includes the second set of data.

In the present example, method 300 ends at 316.

Figure 4:
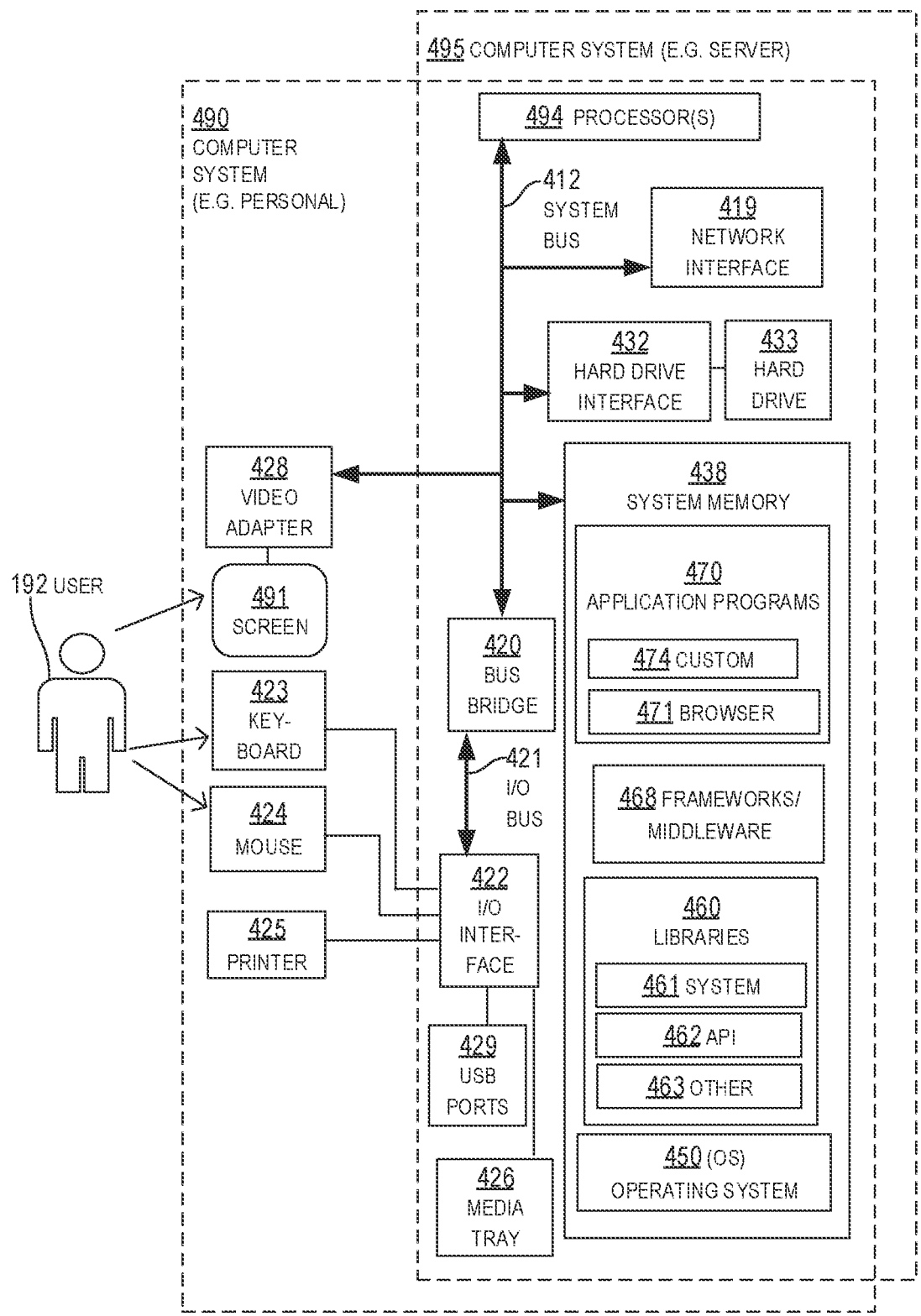
FIG. 4 is a block diagram showing additional components of sample computer systems, according to embodiments of the present disclosure that comprise improvements in automated computerized systems.

FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of OPF 189 and/or a computer system that is part of any entity or system shown in any of the Figures of the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 495, or the computer system 490, are not intended to be exhaustive. Rather, they are representative, for highlighting essential components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor(s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 2771, which is a software that can permit the user 192 to access other devices in the internet, for example while using a Graphic User Interface (GUI). The browser 2771 includes program modules and instructions that enable the computer system 495 to exchange network messages with a network, for example using Hypertext Transfer Protocol (HTTP) messaging.

The application programs 470 may include one or more custom applications 474, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 470 may include a contacts application, a book reader application, a database application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all, of these aspects have even similar reference numerals.)

Figure 5:
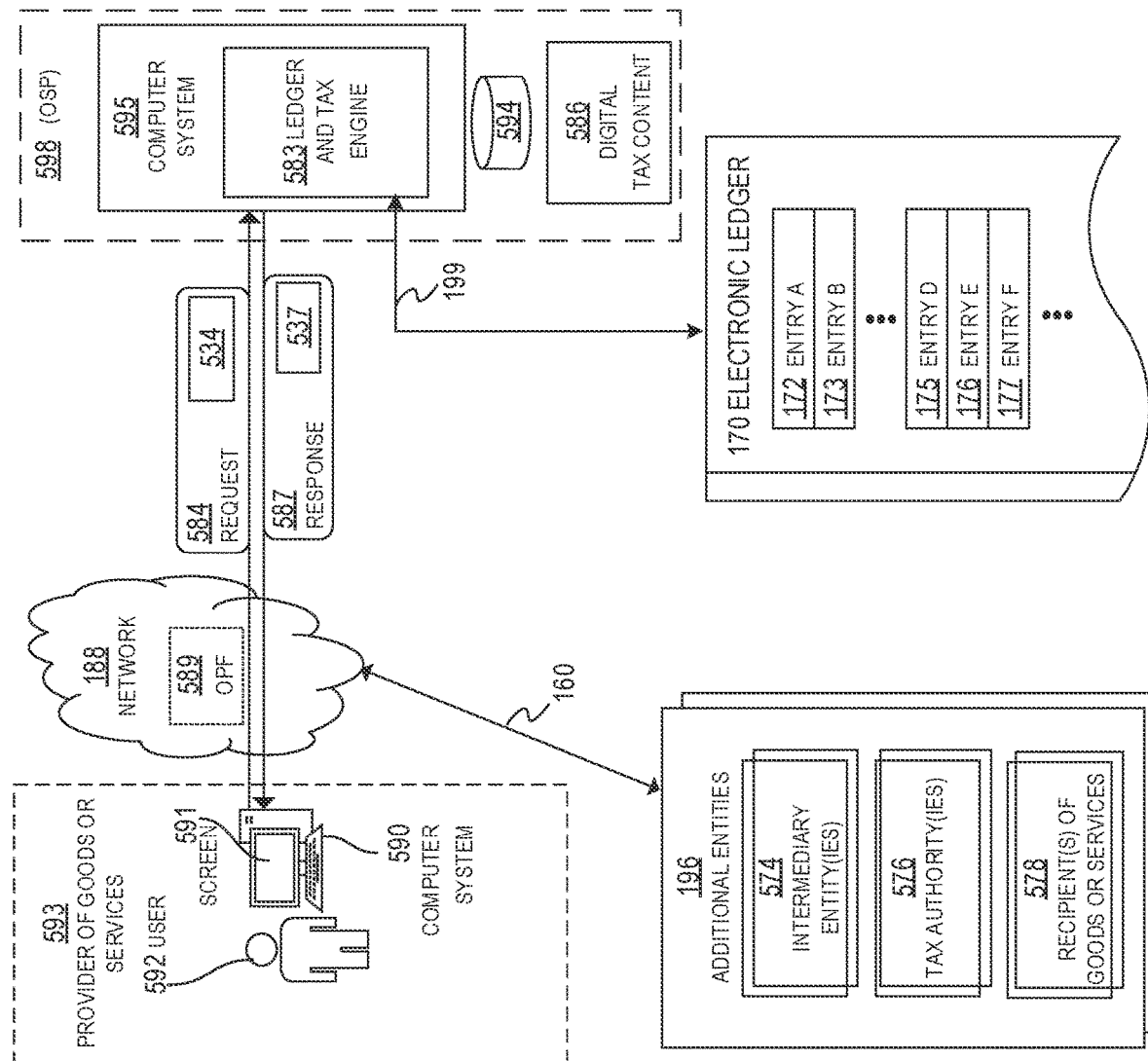
FIG. 5 is a diagram of sample aspects for describing operational examples and use cases of embodiments of the present disclosure that comprise improvements in automated computerized systems.

FIG. 5 is a diagram of sample aspects for describing operational examples and use cases of embodiments of the present disclosure that comprise improvements in automated computerized systems.

The electronic ledger 170 enables tax authorities, such as tax authorities 576 to enforce, maintain, and automate the ability to achieve $0 of lodging tax fraud for an indefinite period. The process of calculating, remitting, and filing lodging taxes currently suffers from an information asymmetry problem which is described as follows. The property owner receives bookings through a variety of avenues including direct listings and lodging marketplace entities. In the present example, the property owner is an example of a provider of goods or services 593 and the lodging marketplace entity is an example of an intermediary entity 574. Specific examples of lodging marketplace entities include, but are not limited to, those that provide listing platforms (such as AirBnb® or VRBO®), and/or marketplace aggregators (e.g. Evolve®, in which the property owner hires a firm to do a combination of direct listing and listing platforms). Based on the location, revenue, number of nights stayed, and various other factors, the property owner calculates and remits lodging taxes to the tax authority 576. However, the property owner can under, or over, report revenue based on the aforementioned factors (whether it be intentional or unintentional). Traditionally, tax authorities must manually audit lodging returns in order to detect fraud or overpayment. It is also an expensive and laborious process to collect underpayments and refund overpayments. The OSP 598 and electronic ledger 170 implemented by the OSP 598 execute a method as a technical improvement and solution for overcoming this information asymmetry problem by helping facilitate the remittance process with the OSP 598 also acting as a trusted third party using the electronic ledger 170 to verify and validate regulations and tax rates established by the tax authorities 576.

Using the system disclosed in FIG. 5, tax authorities 576 can publish lodging tax rates and regulations, in real-time via the OSP 598, to the electronic ledger 170. Property owners who are subscribed to the electronic ledger 170 can leverage the regulations and logic published to the electronic ledger 170 by the applicable tax authority 576 to charge and remit lodging taxes in real-time. Then, OSP 598 (or the administrator or owner thereof) takes on a role of a trusted third party, by preparing and filing tax returns and validating that the property owner reported and remitted all applicable taxes. In various embodiments, the ledger and tax engine 583 of the OSP 598 may electronically publish to the electronic ledger 170, using a cryptographic hash or protocol, one or more of: the rate identification; the calculation of the amount of resource due to each tax authority 576 for each lodging stay; the aggregation of the total amount of resources due to each tax authority 576; the preparation and sending of a reporting document; license and registration documents; applications for licenses and registrations; approvals or denials of applications for licenses and registrations; reason for approvals or denials of any entry in the electronic ledger 170; and the electronic remittance of the balance of resources due for each tax authority 576. In some embodiments, all actions, approvals, rejections, etc., are published to the electronic ledger 170 so that there is full auditability and transparency across entities associated with a transaction.

As an example use case, large companies and jurisdictions are presently beginning to enter into "Voluntary Tax Collection Agreements" or "VCAs". A VCA may be an agreement between one or more intermediary entities 574, such as a lodging marketplace entity, and a particular tax authority (such as one in the tax authorities 576) for the one or more intermediary entities 574 to collect and/or remit, on behalf of property owners (which is an example of a provider of goods or services 593), lodging taxes on all lodging stay transactions handled by the one or more intermediary entities 574 that are subject to lodging tax by that particular tax authority. VCAs are established with some, but not all, tax authorities 576, which causes technical intricacies and problems for a single ERP to timely and efficiently determine and remit such lodging taxes on a continuous basis in real-time. In other words, current ERP applications do not have the technical functionality to timely and efficiently determine and remit such lodging taxes on a continuous basis in real-time due to such technical intricacies caused by VCAs. To solve such technical problems, the ledger and tax engine 583 disclosed herein implements and uses electronic ledger 170 to continuously update tax regulations and associated logic and digital rules to account for VCAs, and in conjunction with a license and registration check, determines the appropriate rate(s) and remittances to tax authorities based on entries in the electronic ledger 170.

In the present case, an example of a relationship instance is a transaction for a paid lodging stay for a person or group of people at a property owned or controlled by the provider of goods or services 593. The person or group of people is an example of the recipients of goods or services 578. The lodging stay may instead be paid for by an intermediary entity that is one of intermediary entities 574. For example, the transaction for the lodging stay may be made via an intermediary entity 574, such as a lodging marketplace entity, that handles the transaction for the lodging stay between the provider of goods or services 593 and the recipient of the goods or services 578 via communication 160 over network 188. An entry may be made in the electronic ledger 170 that includes some or all of the data included the communication 160 between the intermediary entity 574 and the provider of goods or services 593 and the recipient of the goods or services 578. In one embodiment, a copy of the communication 160 and/or data included in communication 160 may be automatically sent in real-time and/or subsequently sent to the ledger and tax engine 583 of the OSP 598 in near real-time for entry into the electronic ledger 170. For example, values that characterize attributes of the transaction may be extracted from the communication 160 and may include, but are not limited to: price, fees and/or or rate for the paid lodging stay; taxes for the paid lodging stay; address or location of the lodging; number of days of the paid lodging stay; accommodations or services included in the paid lodging stay; identification of the provider of goods or services 593, the provider of goods or services 593 and the recipient of the goods or services 578; a contract or agreement regarding the paid lodging stay; a contract or agreement regarding collection or remitting of taxes for the paid lodging stay; other terms of the paid lodging stay; etc.

In some instances, some or all of the data comprising the communication 160 may be sent directly to the OSP 598 from one or more of the additional entities 196. In various embodiments, the provider of goods or services 593 may also or instead book lodging stays for and transact directly with occupants, such as the recipient of goods or services 578, for lodging stays at the same or different properties. In such embodiments, the transaction would be directly between the provider of goods or services 593 and the recipient of goods or services 578 instead of being made via the intermediary entity 574.

It will be recognized that aspects of FIG. 5 have similarities with aspects of FIG. 1. Portions of such aspects may be implemented as described for analogous aspects of FIG. 1. A computer system 595 is shown, which is used to help customers, such as a user 592, with tax compliance and use of the electronic ledger 170 may be part of that service. Further in this example, the computer system 595 is part of an OSP 598 that is implemented as a Software as a Service (SaaS) provider, for being accessed by the user 592 online. Alternately, the functionality of the computer system 595 may be provided locally to a user.

The user 592 may be standalone. The user 592 may use a computer system 590 that has a screen 591. In embodiments, the user 592 and the computer system 590 are considered part of the provider of goods or services 593, which is also known as entity 593. The provider of goods or services 593 can be a business, such as a seller of items, a reseller, a buyer, and so on. In this present case, the provider of goods or services 593 is a lodging operator, which is an individual or business that rents a short-term rental or vacation rental to another entity, such as, for example, recipient of goods or services 578. In such instances, the user 592 can be an employee, a contractor, or otherwise an agent of the entity 593. In use cases, the provider of goods or services 593 is a seller (e.g., of right or limited license to use particular lodging for a limited time), the recipients of goods or services 578 is a buyer (e.g., of the right or limited license to use the particular lodging for a limited time) and together they are performing a buy-sell transaction. The buy-sell transaction may involve an operation, such as an exchange of data to form an agreement (e.g., an agreement for renting lodging). This operation can be performed in person, or over the network 188, etc. In such cases the entity 593 can even be an online seller, but that is not necessary. The transaction will have data that is known to the entity 593, similarly with what was described regarding the relationship instance of FIG. 1. In the present example, the transaction may be made via an intermediary entity 574.

In a number of instances, the user 592, and the additional entities 196 use software applications to manage their business activities, such as sales, resource management, production, inventory management, delivery, billing, tax collection, issuing licenses and registrations, and so on. The user 592 and the additional entities 196 may further use accounting applications to manage purchase orders, reservations, bookings, sales invoices, refunds, payroll, accounts payable, accounts receivable, and so on. Such software applications, and more, may be used locally by the user 592 or additional entities 196, or from an Online Processing Facility (OPF) 589 that has been engaged for this purpose by the user 592, the provider of goods or services 593 and/or additional entities 196. In such use cases, the OPF 589 can be a Mobile Payments system, a Point Of Sale (POS) system, an accounting application, an Enterprise Resource Planning (ERP) provider, an e-commerce provider, an electronic marketplace, a Customer Relationship Management (CRM) system, and so on. In some embodiments, the OPF may be, or be used by, one or more of the additional entities 196.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority 576 offers a temporary tax holiday, during which certain taxes are waived.

Tax jurisdictions are defined mainly by geography. Businesses have tax obligations to various tax authorities within the respective tax jurisdictions. There are various tax authorities 576, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself and/or its products or services with the tax authority's taxing agency, b) become licensed via the tax authority 576 or other governmental or regulatory agency c) set up internal processes for collecting sales tax in accordance with the sales tax rules of the tax authority 576, d) maintain records of the sales transactions and of the collected sales tax in the event of a subsequent audit by the taxing agency, e) periodically prepare a form ("tax return") that includes an accurate determination of the amount of the money owed to the tax authority 576 as sales tax because of the sales transactions, f) file the tax return with the tax authority 576 by a deadline determined by the tax authority 576, and g) pay ("remit") that amount of money to the tax authority 576. In such cases, the filing and payment frequency and deadlines are determined by the tax authority 576.

A technical challenge for businesses is that the above-mentioned software applications generally cannot provide tax information that is accurate enough for the businesses to be tax compliant with all the relevant tax authorities efficiently, much less in real-time. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority 576 audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority 576 such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

In an example case, the intermediary entity 574 may electronically collect payment from the recipient of goods or services 578 and electronically provide such payment (possibly minus a fee) to the provider of goods or services 593 via network 188. The intermediary entity 574 may in various embodiments be a listing platform accessible via network 188 that advertises property listings for lodging stays and handles transactions for such lodging stays for a plurality of lodging operators or property owners such as the provider of goods or services 593. Such a transaction is an example of a relationship instance between the provider of goods or services 593 and the recipient of goods or services 578. The transaction may also be an example of a relationship instance between the provider of goods or services 593 and the intermediary entity 574.

In some embodiments, along with collecting payment for the lodging stay on behalf of the provider of goods or services 593, the intermediary entity 574 may also collect lodging taxes due to one or more domains, such as one or more different tax authorities 576 of respective tax jurisdictions in which the property is located or with which the property is associated. In various embodiments, the intermediary entity 574 may collect such lodging taxes according to a VCA. As mentioned earlier, the VCA may be an agreement between the intermediary entity 574 and a particular tax authority (such as one of the tax authorities 576) for the intermediary entity 574 to collect and/or remit, on behalf of property owners such as the provider of goods or services 593, lodging taxes on all lodging stay transactions handled by the intermediary entity 574 that are subject to lodging tax by that particular tax authority. However, the intermediary entity 574 may not have a VCA with all the tax authorities for all the tax jurisdictions in which the property is located (e.g., state, county, city, other municipal or special tax jurisdictions, etc.). The provider of goods or services 593 may also or instead book lodging stays for and transact directly with occupants, such as the recipient of goods or services 578, for lodging stays at the same or different properties. The source of revenue for such lodging stays is referred to as a direct listing as opposed to a source of revenue associated with a VCA, such as the intermediary entity 574. In such cases of direct listings, the provider of goods or services 593 may not even be aware of particular tax obligations and associated lodging taxes that the intermediary entity 574 may or may not have otherwise collected (e.g., under terms of the VCA) if the transaction were made via the intermediary entity 574. Thus, with multiple sources of revenue received for lodging stays in multiple different tax jurisdictions each having different tax regulations and rates, for which taxes may or may not have been collected, a technical problem is presented of how to ensure automatic calculation of tax obligations, preparation and filing of tax return documents and remittance of taxes are performed in an accurate and timely manner. This problem is especially exacerbated for property owners with multiple different properties located in different tax jurisdictions, and that each have multiple different listings for short term stays using different listing platforms and direct listings.

To help with such complex determinations in real-time and solve such technical problems, the computer system 595 may be specialized device for tax compliance as disclosed herein that implements an electronic ledger 170. The computer system 595 may have one or more processors and memory, for example, as was described for the computer system 195 of FIG. 1. The computer system 595 thus implements a ledger and tax engine 583 to not only make the determinations of tax obligations and perform preparation and sending of associated tax return document(s), but also provide an electronic ledger 170 that is publicly accessible and auditable in real-time for all activities, and all entities, involved in lodging and other taxable transactions. The ledger and tax engine 583 can be as described for the service engine 183. The electronic ledger enables the OSP 598 to validate, in real-time, the accuracy of information and remittance of taxes by the provider of goods or services 593, and the rates and rules published by the taxing authorities 576.

The computer system 595 and electronic ledger 170 may further store locally entity data, i.e. data of user 592, of entity 593 and/or additional entities 196, which may include a customer, and/or a seller or a buyer in a sales transaction in various embodiments. The entity data may include profile data of the customer and transaction data (e.g., including a unique identifier associated with the lodging stay or a source of revenue for the lodging stay) from which a determination of a tax obligation is desired. In the online implementation of FIG. 5, the OSP 598 has a database 594 and electronic ledger 170 for storing the entity data. In some embodiments, the database 594 may contain all or some of the electronic ledger 170. This entity data may be inputted by the user 592, and/or caused to be downloaded or uploaded by the user 592 from the computer system 590, from the intermediary entity 574, from other additional entities 196 or from the OPF 589, or extracted from the computer system 590, from the intermediary entity 574, from other additional entities 196 or from the OPF 589, and so on. In the present example embodiment, some or all of this entity data is included and provided as entries in the electronic ledger 170.

A digital tax content 586 is further implemented within the OSP 598. The digital tax content 586 can be a utility that stores digital tax rules 570 for use by the ledger and tax engine 583. The digital tax content 586 may also be included as entries in the electronic ledger 170. As part of managing the digital tax content 586, there may be continuous updates of the digital tax rules, by inputs gleaned from the tax authorities 576 that comprise entries by the tax authorities in the electronic ledger 170. Updating may be performed by humans, or by computers, and so on. As mentioned above, the number of different tax authorities 576 may be very large.

In the present example, the computer system 590 transmits a request 584 that includes a payload 534 including data that is to be entered in the electronic ledger 170. The data that is to be entered in the electronic ledger 170 is received by the computer system 595 parsing the received payload 534. In an example embodiment, the data that is to be entered in the electronic ledger 170 has been received because it is desired to determine any tax obligations arising from the buy-sell transaction 597. However, in various cases, the data of payload 534 may be received for the sole purpose of entering the data into the electronic ledger 170 as may be indicated by the request 584 to facilitate the transaction.

The data received as part of payload 534 that is to be entered in the electronic ledger 170 may have values that characterize attributes of the transaction. Accordingly, data received as part of payload 534 that is to be entered in the electronic ledger 170 may have values indicating one or more of, but not limited to: an identity of the transaction; the name of the provider of goods or services 593 or the user 592, which can be the seller making sales transactions, some online; relevant data of the provider of goods or services 593 or the user 592, such as an address, place(s) of business; prior nexus determinations with various tax jurisdictions; the name or other identifier of one or more additional entities 196, which can be one or more recipients of the goods or services 578 (e.g., a buyer), one or more intermediary entities 574 and/or one or more tax authorities 576; relevant data of the additional entities 196, entity-driven exemption status; sale price of the service of product sold (or in this case the price of the lodging stay); a contact information element; transactions of an entity; an identifier of a specific source of revenue received for a transaction of an entity; characteristics of transactions of an entity; licensure and/or or registration of an entity and/or products or services the entity produces, sells, stores and/or transfers; products or services produced, sold, stored and/or transferred by an entity; types of products or services produced, sold, stored and/or transferred by an entity; a location to which products are sent, shipped or transferred; a location from which products are received; a location of a property owned by an entity; a location of a property owned by an entity within a particular region, tax jurisdiction or other domain; an affiliation; a characterization of another entity; a characterization by another entity; an association or relationship with another entity (general or specific instances); an asset of an entity; a declaration by or on behalf of the entity; a unique identifier that contains or identifies information identifying or regarding a revenue source system for revenue received for a lodging stay or other transaction; the location(s) of one or more properties being rented; and so on.

For example, data received as part of payload 534 that is to be entered in the electronic ledger 170 may be or include a Globally Unique Identifier (GUID) or a Universally Unique Identifiers (UUID) that identifies a system of the intermediary entity 574 as the source of revenue for the lodging stay transaction and may also identify and/or include data regarding any VCAs that the intermediary entity 574 has agreed to. The data received as part of payload 534 that is to be entered in the electronic ledger 170 may also indicate an amount of particular lodging taxes already collected for the transaction by the intermediary entity 574 under such VCAs. In another example, the data received as part of payload 534 that is to be entered in the electronic ledger 170 may identify the computer system 590 of the user 592 as the source of revenue for the lodging stay transaction in the case of a direct listing. The data received as part of payload 534 that is to be entered in the electronic ledger 170 may identify a location of the property of the lodging stay for the lodging stay transaction for the ledger and tax engine 583 to determine which tax jurisdictions the property is located in, and thus which digital tax rules to apply based on specific tax rates published by the tax authorities 576 in the electronic ledger 170 and determine the overall tax obligation and individual tax obligations due to particular tax authorities 576. The data received as part of payload 534 that is to be entered in the electronic ledger 170 may have fewer values or have additional values. These values may characterize further attributes, such as characteristics of the property, data identifying of or otherwise relating to a license or registration required for the transaction, a date and possibly also time of the transaction 597, and so on.

The computer system 595 may then cause a notification to be included as part of a response 587 to be transmitted regarding an entry or status of an entry in the electronic ledger 170. For example, the notification as part of a response 587 can be that a requested entry has been made in the electronic ledger 170, that an entry in the electronic ledger 170 has been rejected or approved and by which entity, or that an entry in the electronic ledger 170 has been made indicating a determined tax obligation, similarly with the response 187 of FIG. 1. In the example of FIG. 5, the notification 536 is caused to be transmitted by the computer system 595 as an answer to the received request 584. In particular, the notification 536 may also inform about an aspect of a tax obligation, namely that it has been determined, where it can be found in the electronic ledger 170, what it is, or at least a portion or a statistic of its content, and so on.

The notification included in the response 587 can be transmitted to one of an output device and another device that can be the remote device, from which the request 584 was received. The output device may be the screen of a local user or a remote user. The notification may thus cause a desired image to appear on the screen 591, such as within a Graphical User Interface (GUI) and so on. The other device may be a remote device, as in this example. In particular, the computer system 595 causes the notification to be communicated by being encoded as a payload 537, which is carried by the response 587. The response 587 may be transmitted via the network 188 responsive to the received request 584.

The response 587 may be transmitted to the computer system 590, intermediary entities 574, to other additional entities 196 or to OPF 589, and so on. As such, the other device can be the computer system 590, a device of the OPF 589, a device of an intermediary entity 574, a device of other additional entities 196, or the screen 591 of the user 592, and so on. In various embodiments, the additional entities 196 communicate with and obtain services of the OSP 598 and electronic ledger 170 in the same or similar manner as that of the provider of goods or services 593 and thus, the computer system 590 may represent a computer system of such entities. In this example, the single payload 537 encodes the entire notification, but that is not required. It is advantageous to embed in the payload 537 an ID value and/or one or more values of the request 584 or payload 534. This will help the recipient correlate the response 587 to the request 584, and therefore match the received notification as the answer to the received request 584. In some embodiments, the request 584 and/or response 537 are automatically generated based on APIs of the sender and/or recipient operating in the back ground to provide services related to tax compliance and the electronic ledger 170.

In various embodiments, the electronic ledger 170 may be used in cases that extend beyond lodging transactions, including transactions involving sales of any type of goods or services. Also, the electronic ledger 170 may be used to: determine and remit taxes and tax returns related to transactions; automatically check the transaction, goods or services, and entities involved in the transaction are complying with current regulations, such as registration and licensing requirements; and electronically apply for and/or update documents to obtain such license and registrations and correct other discrepancies for the transaction to proceed or complete. For example, all entities related to a transaction, such as the provider of the goods or services 593, the intermediary entities 574, the tax authorities 576, the recipients of goods or services 578, the OSP 598 and other applicable additional entities 196, may utilize the electronic ledger 170, via a GUI and/or API provided by the OSP 598, to enter any applicable data related to a transaction into electronic ledger 170. In many instances such data may be automatically entered into the electronic ledger 170 as the transaction is occurring or immediately after the transaction has occurred in real-time. Such entries in the electronic ledger 170 are digitally signed by the entity from which it originated or that made the entry and are made visible to and subject to review and approval by one or more applicable other entities that also subscribe to the electronic ledger 170. If there is a problem or discrepancy in any of the data content of the entry (e.g., purchase price, shipping origin or destination, product or service description, markings, licensing or registration data, determined tax amount, source of revenue, etc.) any applicable entity associated with that transaction may reject the entry and that rejection is entered and visible in the electronic ledger 170. The applicable entities associated with the transaction may then be alerted automatically such that those discrepancies may be corrected or otherwise addressed.

For example, the tax and ledger engine 583 enables all entities related to a transaction, such as the provider of the goods or services 593, the intermediary entities 574, the tax authorities 576, the recipients of goods or services 578, the OSP 598 and other applicable additional entities 196 to utilize the electronic ledger 170, via a GUI and/or API provided by the OSP 598, to perform the following actions: publish status regarding aspects of the transaction in real-time on a universal, and aggregated, approval/denial ledger, such as electronic ledger 170; publish in real-time rules, rates and logic for lodging taxes published by taxing jurisdictions, such as by tax authorities 576; file, approve and/or deny sales tax returns in real-time as transactions occur or as tax reporting periods occur and publish underlying metadata in real-time to electronic ledger 170; report in real-time as transactions occur revenue, lodging transactions, and values for other applicable parameters, to electronic ledger 170; validate, in real-time, the accuracy of information and remittance of the taxpayer, such as the provider of goods and services 593; validate the rates and rules published by the taxing jurisdiction, such as tax authorities 576; create in real-time a publicly accessible and auditable electronic ledger, such as electronic ledger 170, for all activities, entities and related data involved in lodging tax transactions, including, but not limited to: lodging transaction data (e.g., time, date, address, value of transaction and tax charged); data regarding jurisdiction(s) to which monies were remitted, such as tax authorities 576; data regarding remaining tax liabilities, and data regarding overpayments.

In the present example embodiment, every entry in the electronic ledger 170 has a unique cryptographic hash/digital signature unique to the entry and entity that made the entry. In some embodiments, for any entry to be entered into the electronic ledger 170, all applicable entities involved in the transaction must validate that the parameters of a given transaction are true. For example, a property owner, such as user 592, may report their revenue from a given lodging transaction as part of payload 534 in request 584 to be entered in the electronic ledger 170 and inserts a cryptographic hash/digital signature to the relevant entry in the electronic ledger 170 indicating that the transaction occurred.

The OSP 598 then verifies or otherwise validates the source of the revenue information and ensures that it complied with rules published to the electronic ledger 170 by the applicable tax authorities 576 before applying a cryptographic hash/digital signature unique to the OSP to an entry in the electronic ledger 170 indicating such validation. Once the applicable tax authorities 576 receive the tax returns/revenue information (e.g., by accessing applicable entries in the electronic ledger 170), the applicable tax authorities 576 make one or more entries to the electronic ledger 170 that indicate acceptance or rejection of all the data published to the electronic ledger 170 associated with the transaction and make one or more digitally signed entries to the electronic ledger 170 that approve or deny that the tax liability has been closed (and apply a cryptographic hash/digital signature to confirm the status of the liability). If, at any point, one or more applicable entities subscribed to the electronic ledger 170 rejects an associated entry to the electronic ledger 170, that rejection is recorded as a digitally signed entry in the electronic ledger 170, and the reason is made public to all applicable entities subscribed to the electronic ledger 170. In some embodiments, approval of a digitally signed entry of a first entity by a second entity comprises the second entity making another digitally signed entry in the electronic ledger 170 identifying the entry of the first entry and indicating such approval. In other embodiments approval of a digitally signed entry of a first entity by a second entity comprises the second entity digitally signing the digitally signed entry of first entry. In this manner, the mechanisms described herein for the OSP 598 and associated electronic ledger 190 comprise a technical solution that provides the ability of real-time publishing of rates, rules, and regulations as well as real-time compliance to rates, rules, and regulations, thereby enabling tax authorities 576 to enforce, maintain, and automate the ability to achieve $0 of lodging tax fraud for an indefinite period. Thus, the systems and methods described herein for an electronic ledger 170 improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Figure 6:
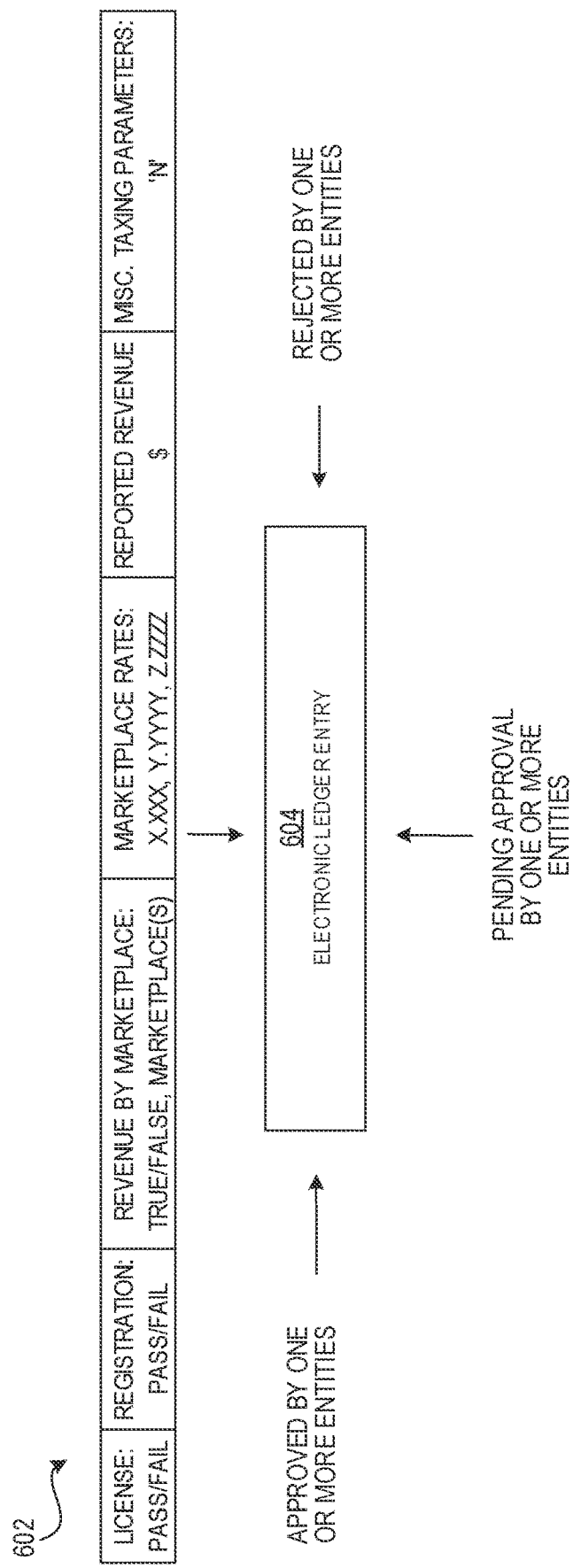
FIG. 6 is a diagram of an example of how an electronic ledger system entry operates with respect to data from a given tax filing period, according to embodiments of the present disclosure that comprise improvements in automated computerized systems.

FIG. 6 is a diagram of an example of how an electronic ledger system operates with respect to data from a given tax filing period, according to embodiments of the present disclosure that comprise improvements in automated computerized systems. FIG. 6 illustrates how entities involved in one or more transactions interact in an electronic ledger system such as electronic ledger 170 of FIG. 1 and FIG. 5. In an example embodiment, one or more entities involved in a transaction may make an electronic ledger entry 604 in the electronic ledger 170. In the present example, the ledger entry data 602 included in the electronic ledger entry 604 may indicate: whether an application for or other aspects regarding a license related to the transaction has passed or failed regulatory requirements; whether an application for or other aspects regarding a registration related to the transaction has passed or failed regulatory requirements; an indication whether a source of revenue for the transaction is from an intermediary such as an online lodging marketplace that has a VCA with one or more tax authorities and an one or more identifiers of such marketplaces; individual tax rates (denoted by "x.xxx", "y.yyy" and "z.zzz") associated with such marketplaces and/or tax jurisdictions associated with VCAs of such marketplaces; an amount of the reported revenue resulting from the transaction; and other miscellaneous tax parameters "n". For example, the other miscellaneous tax parameters "n" may include data received as part of payload 534 of FIG. 5 that is to be entered in the electronic ledger 170 and may have values that characterize attributes of the transaction as described above regarding the data received as part of payload 534.

In various embodiments, electronic ledger entry 604, including such ledger entry data 602, is visible to all of the applicable entities subscribed to the electronic ledger 170, such as the entities shown in FIG. 1 and FIG. 5. Any of the applicable entities subscribed to the electronic ledger 170 may approve or reject the electronic ledger entry 604 based on verification or other validation of the ledger entry data 602 by a particular applicable entity. Such an approval or rejection will also be reflected and visible to all such entities in the electronic ledger 170. Also, until the electronic ledger entry 604 is approved by all such applicable entities a "pending approval" status of the electronic ledger entry 604 may be reflected in the electronic ledger 170. In some embodiments, a default status of the electronic ledger entry 604 of "pending approval" will be reflected in the electronic ledger 170 until the electronic ledger entry 604 is approved by all such applicable entities. In other embodiments, each individual applicable entity will have an option (e.g., via a GUI) to enter in the electronic ledger 170 a status of the electronic ledger entry 604 of "pending approval", "rejected" or "approved" from that particular entity.

In one example embodiment, a marketplace may write to the electronic ledger 170 making an electronic ledger entry 604 indicating that a lodging stay occurred, the duration, the revenue, and the taxable amount. The ledger entry 604 may dictate that one or more applicable entities involved in the transaction must validate this information. System(s) represented, or being utilized, by a renter or owner, such as that of user 592 may then in/validate that ledger entry 604.

In another example embodiment, a tax authority 576 may publish regulations via an electronic ledger entry 604 that must be followed by all systems on the electronic ledger 170 such as tax rates and information that must be submitted on every transaction. All participants on the electronic ledger 170 would then be required to adhere to these regulations. For example, adherence to these regulations published on the electronic ledger 170 may be verified or otherwise validated by the tax authority 576 and/or the OSP 598 based on entries including relevant information made in the electronic ledger 170 by the entities involved in the transaction (e.g., the provider of goods or services 593, such as a seller; the recipient of goods or services 578, such as a buyer; an intermediary entity 574 and/or other additional entities 196). In some embodiments, such entries including relevant information (including electronic ledger entry 604) made in the electronic ledger 170 by the entities involved in the transaction may be made automatically, triggered by point of sale or other electronic systems associated with processing the transaction.

In yet another example embodiment, a property owner, such as user 592, may validate that a renter made a booking and successfully stayed at the residence. Dates, number of people, address, and other taxation information may be included in electronic ledger entry 604 and entered in the electronic ledger 170 for other applicable entities to see and use to validate dependent system entries. For example, the accuracy of some entries in the electronic ledger (e.g., an entry that indicates a taxation calculation or tax amount due) may depend on information that may be provided in real-time by other entities as entries in the electronic ledger 170 (e.g., an entry that indicates a amount of revenue received and date received).

Figure 7:
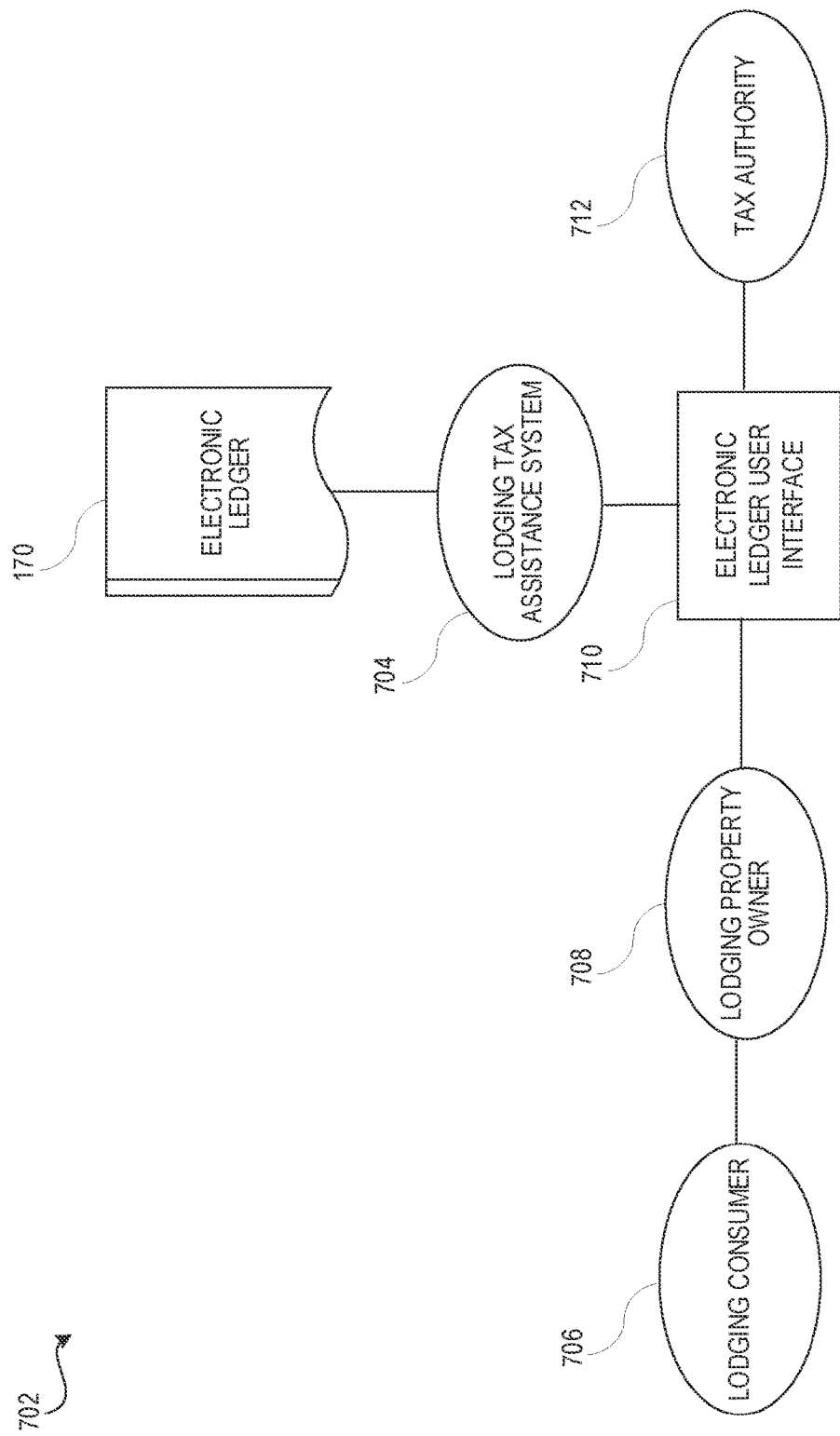
FIG. 7 is a diagram of an example system for an electronic ledger that shows example relationships between different entities in the system, according to one embodiment of the present disclosure that comprises improvements in automated computerized systems.

FIG. 7 is a diagram of an example system 702 for an electronic ledger that shows example relationships between different entities in the system 702, according to one embodiment of the present disclosure that comprises improvements in automated computerized systems. Shown is a lodging tax assistance system 704 that may comprise, be part of or be implemented by the OSP 598 of FIG. 5. Also shown is a lodging consumer entity 706, which is an example of the recipient of goods or services 578 of FIG. 5, and a tax authority entity, which is an example of one of the tax authorities 576 in FIG. 5. The lines in FIG. 7 represent relationships between the entities or systems of FIG. 7, which may include channels of electronic communication between various systems of the respective entities over network 188 of FIG. 1 and FIG. 5.

In the present example, the lodging tax assistance system 704 owns, manages, administers, operates and audits the electronic ledger 170. In doing so, the lodging tax assistance system 704 provides an electronic ledger user interface 710 for entities shown connected via lines to the electronic ledger user interface 710 to make entries to the electronic ledger 170, edit their own entries made in the electronic ledger 170, view entries made in the electronic ledger 170, approve or reject entries in the electronic ledger 170 and otherwise access and use the electronic ledger 170 via the electronic ledger user interface 710. The electronic ledger user interface 710 may include a GUI with selectable user interface elements for various entities to access and use the electronic ledger 170 on various devices including, but not limited to: computers, server devices, client devices, tablet devices, smartphones and other mobile devices and computing devices. In some embodiments, the electronic ledger user interface 710 may be customized based on the type of entity accessing the electronic ledger user interface 710. For example, the electronic ledger user interface 710 may provide the tax authority 712 a customized user interface particularly suited to facilitate publishing of tax regulations to the electronic ledger 170 while the electronic ledger user interface 710 may provide the lodging property owner 708 a customized user interface particularly suited to making entries into the electronic ledger for lodging stays. In some embodiments, as shown in FIG. 7, a lodging consumer 706 may not have direct access to the electronic ledger user interface 710 and the lodging tax assistance system 704 will instead rely on lodging stay information (e.g., lodging consumer information, dates of lodging stay and revenue received for the lodging stay, etc.) being provided by electronic ledger entries of the lodging property owner 708 to the electronic ledger 170, who in turn received such information from the lodging consumer 706. In various embodiments, the system 702 may include additional lodging consumers, lodging property owners and tax authorities that are each provided access the electronic ledger 170 via the electronic ledger user interface 710 as shown in FIG. 7.

Figure 8:
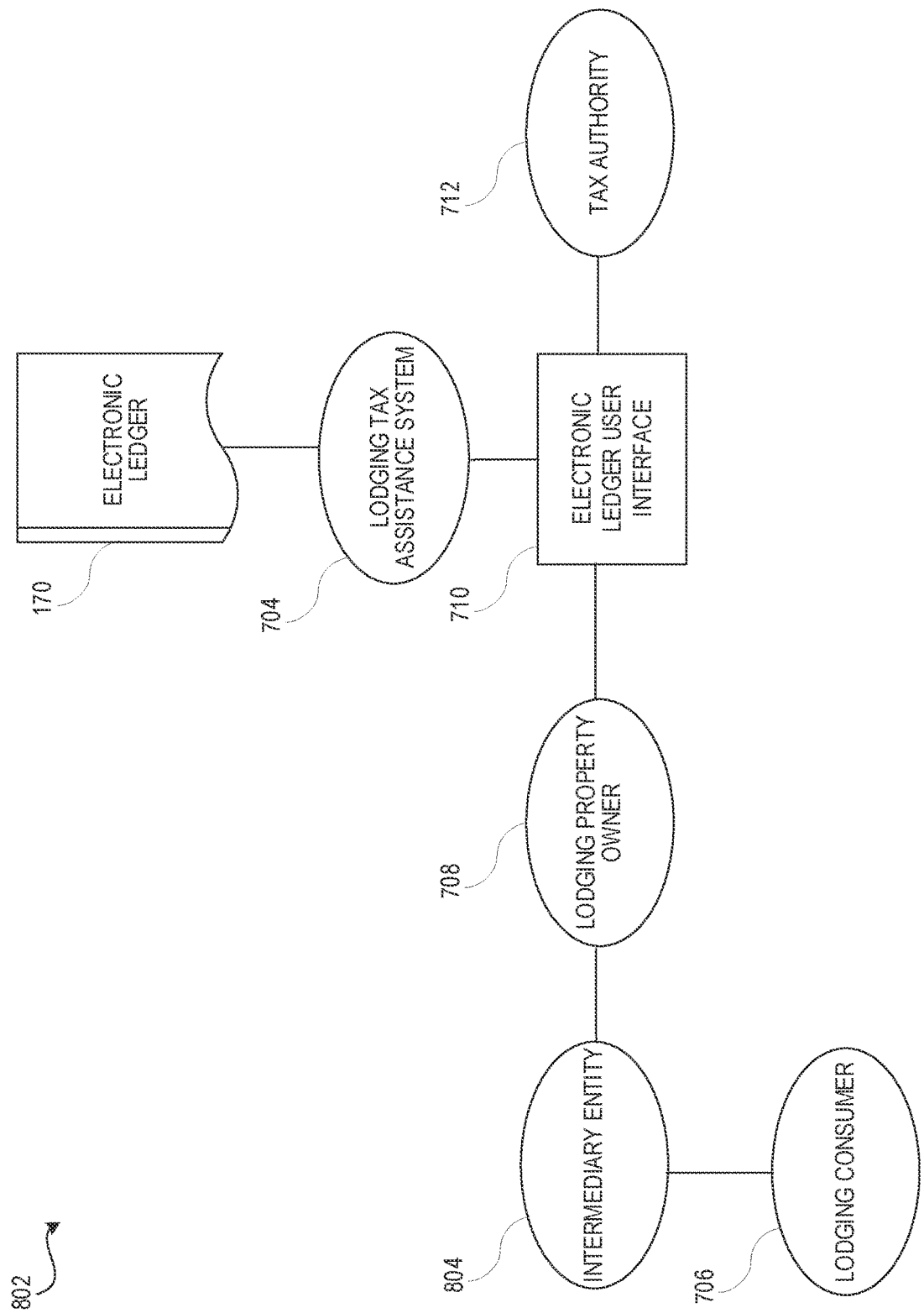
FIG. 8 is a diagram of an example system for an electronic ledger that shows example relationships between different entities in the system, according to another embodiment of the present disclosure that comprises improvements in automated computerized systems.

FIG. 8 is a diagram of an example system 802 for an electronic ledger that shows example relationships between different entities in the system 802, according to another embodiment of the present disclosure that comprises improvements in automated computerized systems. The relationships between the entities of the system 802 are the same as those of the system 702 of FIG. 7, except FIG. 8 illustrates an embodiment that includes an additional intermediary entity 804 that is a business intermediary between the lodging property owner 708 and the lodging consumer 706 to facilitate lodging transactions between the lodging property owner 708 and the lodging consumer 706. The intermediary entity 804 is an example of one or the intermediary entities 574 of FIG. 5. For example, the intermediary entity 804 may be a lodging marketplace entity that handles the transaction for the lodging stay between the lodging property owner 708 and the lodging consumer 706 and may have a VCA with the tax authority 712 to collect lodging taxes. In some embodiments, as shown in FIG. 8, the intermediary entity 804 may not have direct access to the electronic ledger user interface 710 and the lodging tax assistance system 704 will instead rely on lodging stay information (e.g., lodging consumer information, dates of lodging stay and revenue received for the lodging stay, etc.) being provided by electronic ledger entries of the lodging property owner 708 to the electronic ledger 170. The lodging property owner 708 may have received such information from the intermediary entity 804, who may have in turn received such information from the lodging consumer 706. In various embodiments, the system 802 may include additional lodging consumers, intermediary entities, lodging property owners and tax authorities that are each provided access the electronic ledger 170 via the electronic ledger user interface 710 as shown in FIG. 8.

Figure 9:
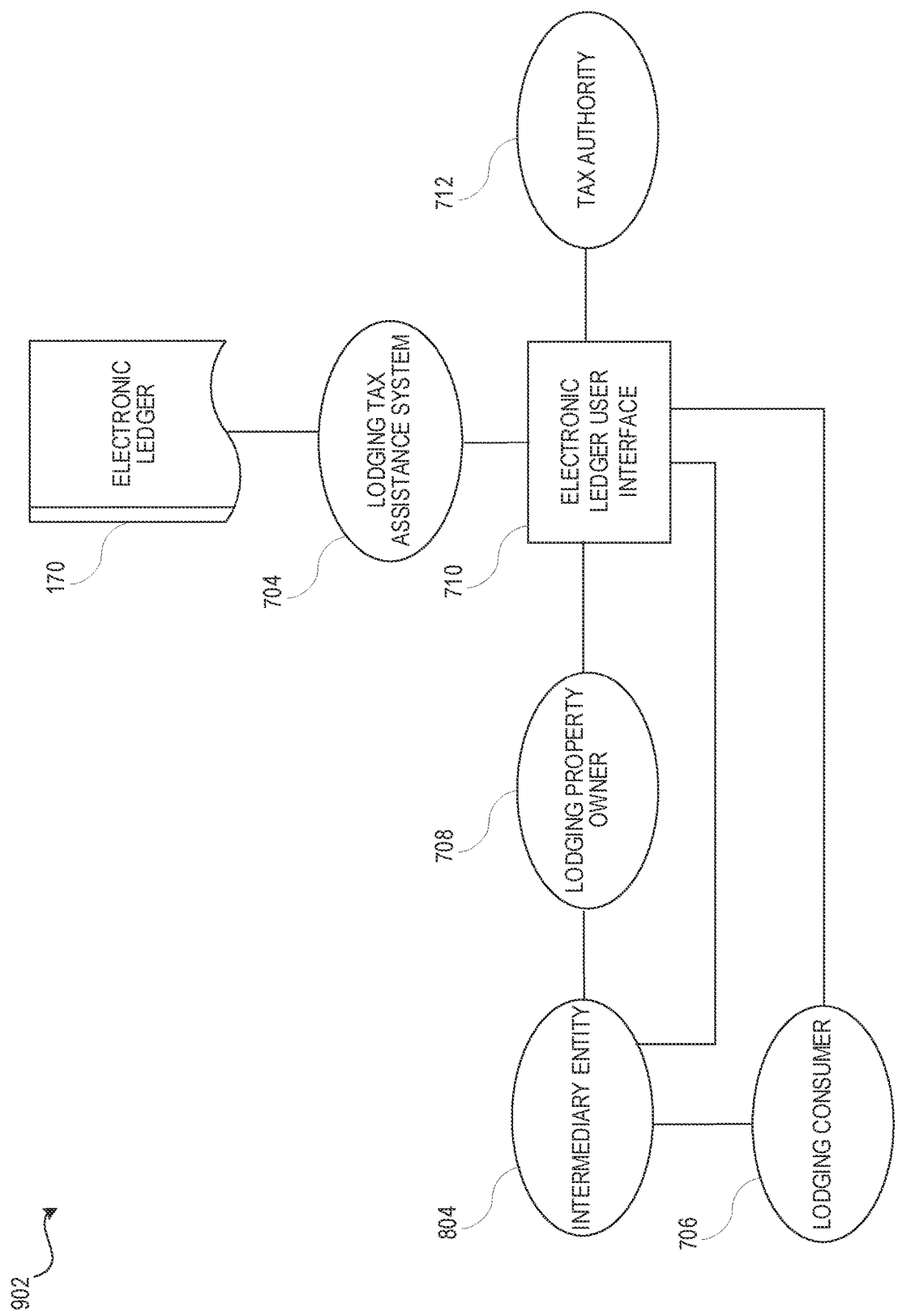
FIG. 9 is a diagram of an example system for an electronic ledger that shows example relationships between different entities in the system, according to yet another embodiment of the present disclosure that comprises improvements in automated computerized systems.

FIG. 9 is a diagram of an example system 902 for an electronic ledger that shows example relationships between different entities in the system 902, according to yet another embodiment of the present disclosure that comprises improvements in automated computerized systems. The relationships between the entities of the system 902 are the same as those of the system 802 of FIG. 8, except FIG. 9 illustrates an embodiment in which the intermediary entity 804 and lodging consumer 706 also have access to the electronic ledger 170 via the electronic ledger user interface 710 to at least make entries in the electronic ledger 170 regarding lodging transactions associated with the intermediary entity 804 and lodging consumer 706. In some embodiments, one or both of the intermediary entity 804 and lodging consumer 706 are also provided the ability to edit their own entries made in the electronic ledger 170, view entries made in the electronic ledger 170, approve or reject entries in the electronic ledger 170 and otherwise access and use the electronic ledger 170 via the electronic ledger user interface 710. In various embodiments, the system 902 may include additional lodging consumers, intermediary entities, lodging property owners and tax authorities that are each provided access the electronic ledger 170 via the electronic ledger user interface 710 as shown in FIG. 9.

In one example embodiment, electronic ledger 170 is owned, administered, operated, and audited by the lodging tax assistance system 704. The lodging tax assistance system 704 provides the electronic ledger user interface 710 for a business intermediary, such as intermediary entity 804, and/or the tax authority 712 to write/publish VCAs, or human readable tax rules/rates, to the electronic ledger 170 for real-time enforcement and certification by the lodging tax assistance system 704. Then, the electronic ledger user interface 710 presented to end users (e.g., lodging property owner 708 and/or intermediary entity 804) ensures that factually correct information is entered for rental activity (revenue and nights stayed). The lodging tax assistance system 704 performs certification by: reconciling data entered by the lodging property owner 708 and information provided by the intermediary entity 804; enforcing all applicable rates and rules published by the intermediary entity 804 or tax authority on the electronic ledger 170; and retrieving and remitting all applicable taxes between the lodging property owner 708, intermediary entity 804 and tax authority 712.

Figure 10:
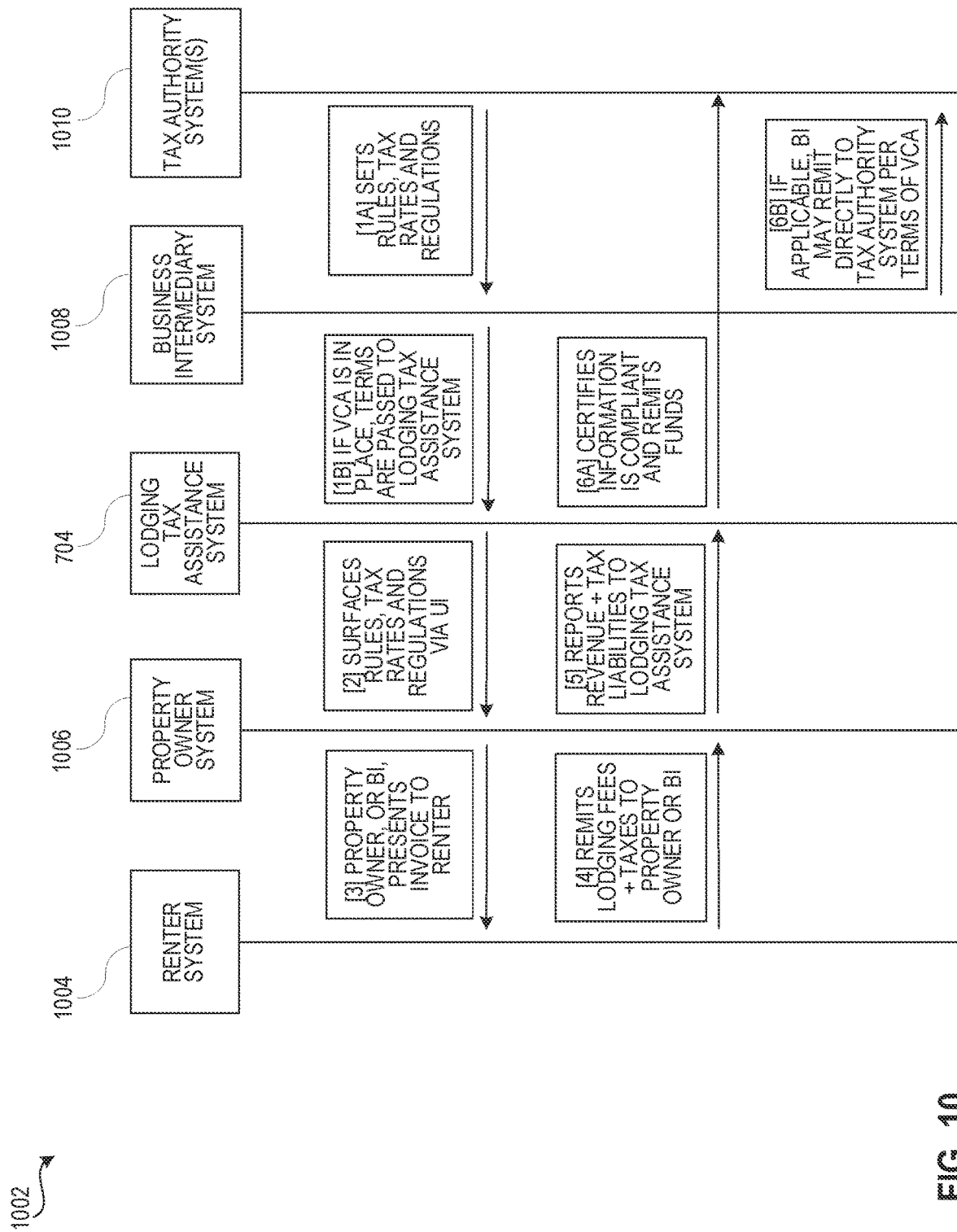
FIG. 10 is a sequence diagram that shows the data flow between one or more systems that help market and/or facilitate the rental of one or more properties and applicable tax payments using an electronic ledger as disclosed herein and illustrates an improvement in automated computerized systems, according to various embodiments of the present disclosure.

FIG. 10 is a sequence diagram 1002 that shows the data flow between one or more systems that help market and/or facilitate the rental of one or more properties and applicable tax payments using an electronic ledger 170 as disclosed herein and illustrates an improvement in automated computerized systems, according to various embodiments of the present disclosure. An electronic ledger system, such as the electronic ledger system 170 of FIG. 1 and FIG. 5, in a lodging transaction, such as a property rental, represents agreement on compliance tasks between four entities: the property renter, the property owner, the taxing authority, and a lodging tax assistance entity. The renter pays taxes to the property owner; the property owner has a tax liability owed the tax authority (payable); the tax authority has a claim to revenue (receivable); and the lodging tax assistance entity is a trusted third party that verifies that (1) the correct amount of payables and receivables are passed through to applicable entities (2) monies are exchanged between entities and (3) the transaction was deemed "complete" by all applicable entities. FIG. 10 illustrates an example workflow of such a transaction. Depending on the taxing jurisdiction(s), transactions are aggregated in monthly, quarterly, bi-annual, and/or annual totals.

As shown in FIG. 10, the renter system 1004 is a system of lodging renter in a lodging stay transaction and is an example of a recipient of goods or services 578 shown in FIG. 5 and the property owner system is an example system of a provider of goods or services 593 shown in FIG. 5. The business intermediary system 1008 is a system of an intermediary between a property owner and the renter in a lodging transaction that facilitates the lodging transaction and is an example system of an intermediary entity 574 shown in FIG. 5. The tax authority system 1010 is a system of a tax authority that promulgates tax regulations related to the lodging transaction and is an example system of a tax authority 576 as shown in FIG. 5. Also, the lodging tax assistance system 704 is a system of a lodging tax assistance entity and may comprise, be part of, or be implemented by, the OSP 598 of FIG. 5.

In step 1A, the tax authority sets human readable rules, tax rates and regulations, which are communicated by the tax authority system 1010 to the business intermediary system 1008. In step 1B, if a VCA is in place, the business intermediary system 1008 passes the terms of the VCA to the lodging tax assistance system 704. In some embodiments, these terms may be published in an electronic ledger 170, such as electronic ledger 170 of FIG. 1 and FIG. 5.

In step 2, the lodging tax assistance system 704 surfaces the human readable rules, tax rates and regulations to the property owner system 1006 via a user interface. In some embodiments, the lodging tax assistance system 704 may surface the human readable rules, tax rates and regulations to the property owner system 1006 via a user interface of the electronic ledger 170.

In step 3, the property owner system 1006 or the business intermediary system 1008 presents an invoice for a lodging stay to the renter system 1004.

In step 4, the renter system 1004 remits lodging fees plus taxes for the lodging stay to the property owner system 1006 or the business intermediary system 1008.

In step 5, the property owner system 1006 or the business intermediary system 1008 reports the amount of the revenue received for the lodging stay and an associated amount of tax liability to the lodging tax assistance system 704. In some embodiments, the property owner system 1006 or the business intermediary system 1008 reports the amount of the revenue received for the lodging stay and an associated amount of tax liability to the lodging tax assistance system 704 as entries to the electronic ledger 170 via an electronic ledger user interface, or via an API in communication with the electronic ledger lodging tax assistance system 704 such that applicable entries may be automatically entered in the electronic ledger 170.

In step 6A, the lodging tax assistance system 704 certifies or otherwise validates that the information reported regarding the amount of the revenue received for the lodging stay and the associated amount of tax liability is compliant with the human readable rules, tax rates and regulations. In some embodiments, the lodging tax assistance system 704 certifies or otherwise validates that the information reported is compliant by referencing human readable rules, tax rates and regulations published in the electronic ledger 170 by the tax authority system 1010 and other applicable entries in the electronic ledger 170 that include data applicable to the transaction. In some embodiments, the lodging tax assistance system 704 may certify that the information reported is compliant by making a digitally signed entry in the electronic ledger 170 indicating such approval or certification of entries in the electronic ledger made by the property owner system 1006 or the business intermediary system 1008 including the reported information. In step 6B, if applicable, the business intermediary system 1008 may electronically remit lodging taxes collected for the lodging transaction directly to the tax authority system 1010. For example, the business intermediary system 1008 may electronically remit lodging taxes collected for the lodging transaction directly to the tax authority system 1010 in response to the lodging tax assistance system 704 certifying or otherwise validating that the information reported regarding the amount of the revenue received for the lodging stay and the associated amount of tax liability is compliant.

Figure 11:
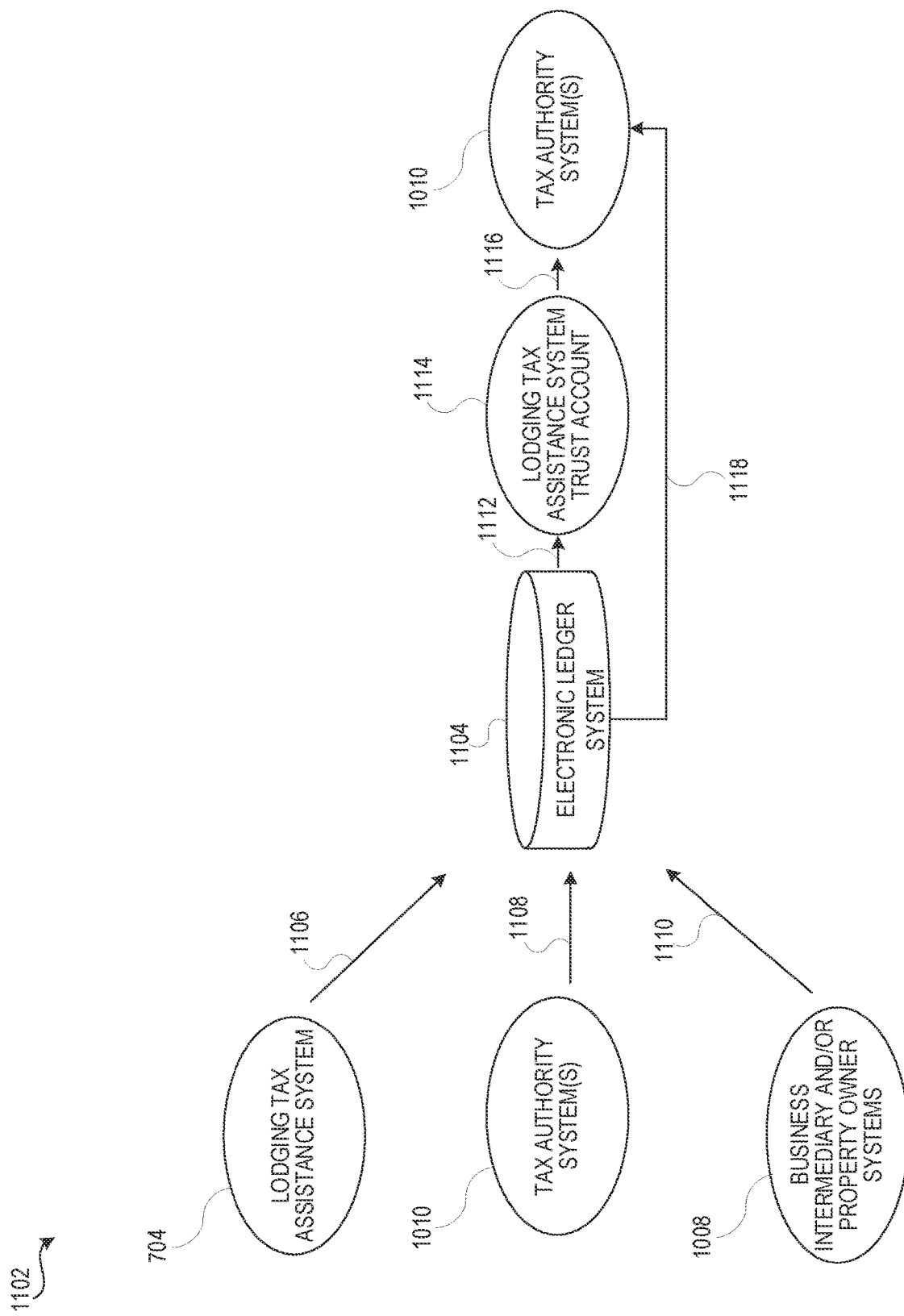
FIG. 11 is a diagram of an example system for an electronic ledger that shows example relationships between different systems in FIG. 10, according to an embodiment of the present disclosure that comprises improvements in automated computerized systems.

FIG. 11 is a diagram of an example system 1102 for an electronic ledger that shows example relationships between different systems of FIG. 10, according to an embodiment of the present disclosure that comprises improvements in automated computerized systems.

Shown in FIG. 11 is an electronic ledger system 1104 that may comprise, be part of or be implemented by the OSP 598 of FIG. 5 and/or the lodging tax assistance system 704. For example, the electronic ledger system 1104 may include the electronic ledger 170 and applicable components of the ledger and tax engine 583 of the computer system 595 of FIG. 5. In some embodiments, the lodging tax assistance system 704 manages, administers, operates, and audits the electronic ledger system 1104 and the electronic ledger system 1104 may in some instances comprise part of the lodging tax assistance system 704.

In the example shown in FIG. 11, communication 1108 represents electronic entries into the electronic ledger system 1104 made by the tax authority system 1010. For example, the tax authority system 1010 can publish rates and human readable rules, in real-time, to the electronic ledger system 1104. Business intermediaries and/or property owners who are subscribed to the electronic ledger system 1104, such as via business intermediary and/or property owner systems 1008, can leverage the rules and logic published by the tax authority system to charge and remit lodging taxes in real-time.

Communication 1110 represents electronic entries into the electronic ledger system 1104 made by the business intermediary and/or property owner systems 1008 regarding such lodging stays (e.g., dates of lodging stays, location of property, number of nights of lodging stay, amount of revenue received, amount of taxes collected, etc.). Then the lodging tax assistance system 704 takes on a role of a trusted third party, by preparing and filing tax returns and validating that the business intermediary and/or property owner reported and remitted all applicable taxes.

Communication 1106 represents electronic entries into the electronic ledger system 1104 made by the lodging tax assistance system 704 approving such entries made by those entities in the electronic ledger system 1104, thus validating that the business intermediary and/or property owner systems 1108 reported and remitted all applicable taxes. Communication 1106 may also represent electronic entries into the electronic ledger system 1104 made by the lodging tax assistance system 704 rejecting such entries made by those entities in the electronic ledger system 1104, thus indicating that the business intermediary and/or property owner systems 1008 did not properly report and remitted all applicable taxes. All actions, approvals, rejections, etc., regarding such transactions between the systems shown in FIG. 11 are published to the electronic ledger system 1104 so that there is full auditability and transparency across all such systems and associated entities.

In one example embodiment, the applicable tax due to a tax authority may be validated and then also remitted by the lodging tax assistance system 704 on behalf of the business intermediary and/or property owner to the tax authority system 1010 via the electronic ledger system 1104. For example, the business intermediary and/or property owner systems 1008 may authorize funds to be transferred electronically to the electronic ledger system 1104 as a trusted third party for purposes of remitting taxes that are due to tax authorities. The electronic ledger system 1104 holds such fund in a lodging tax assistance system trust account 1114 electronically linked to the electronic ledger system 1104 via communication link 1112. In response to the applicable tax due to the tax authority being validated by the lodging tax assistance system 704 based on entries in the electronic ledger system 1104, the lodging tax assistance system trust account 1114 electronically transfers the correct amount of taxes due to the tax authority system(s) 1010 that are electronically linked to the electronic ledger system 704 via communication link 1116. The tax authority system(s) 1010 may include payment accounts and related systems associated with the tax authorities. Transfers of the correct amount of taxes due to the tax authority system(s) 1010 may occur on a periodic basis; each tax year or on other tax cycles; or as transactions are aggregated in monthly, quarterly, bi-annual, and/or annual totals. Transfers of the correct amount of taxes due to the tax authority system(s) 1010 may occur in conjunction with the preparation and filing of associated tax returns by the lodging tax assistance system 704.

Figure 12:
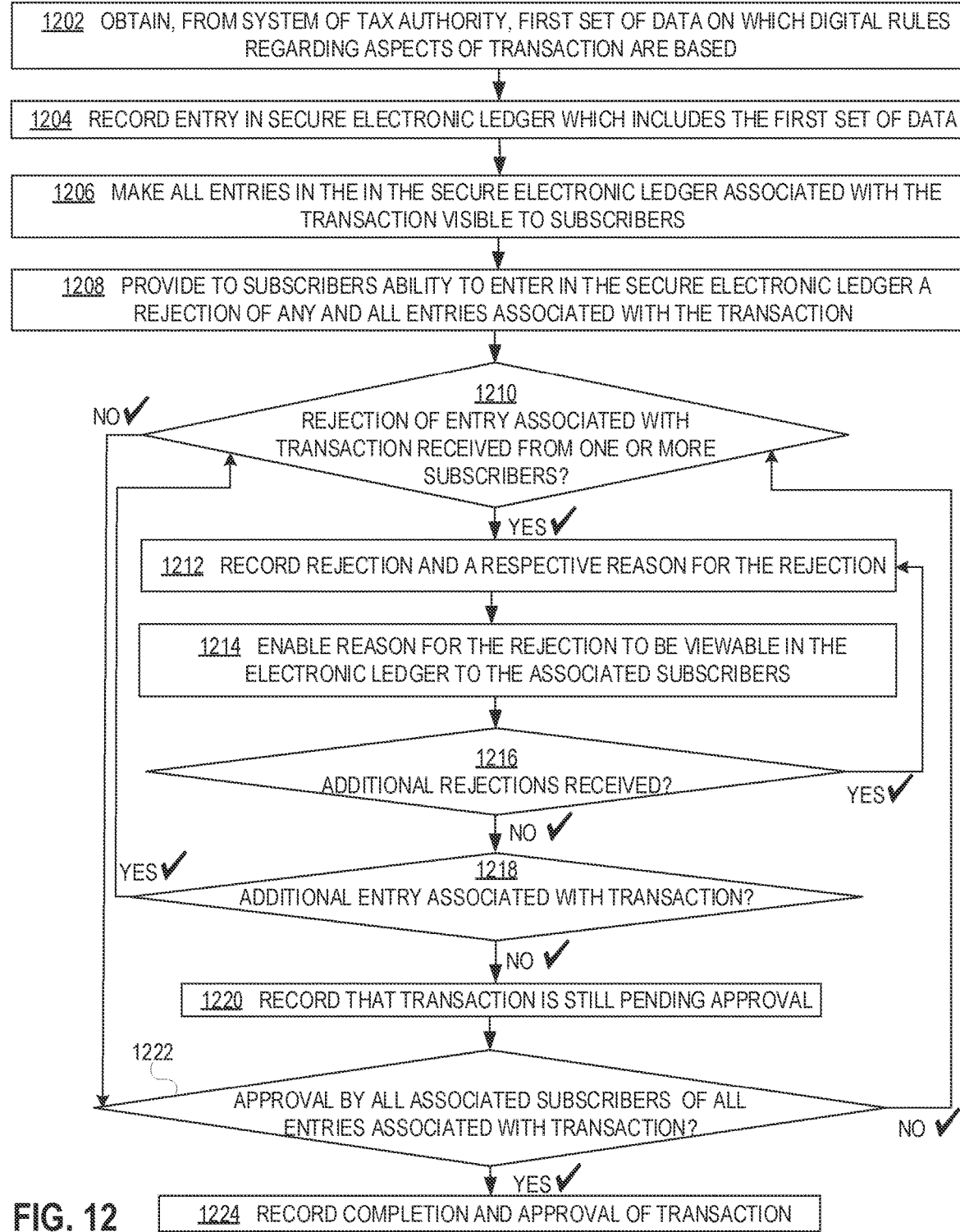
FIG. 12 is a flowchart for describing operational examples and a use cases of embodiments that are improvements in automated computerized systems.

FIG. 12 is a flowchart for describing operational examples and a use cases of embodiments that are improvements in automated computerized systems. An example method 1200 is illustrated that involves a technical process involving a secure electronic edger such as that in the method 300 of FIG. 3 (e.g., electronic ledger 170 of FIG. 1 and FIG. 5) and is useful in the method 300 of FIG. 3 to facilitate tax authorities enforcing, maintaining, and automating the ability to achieve $0 of tax fraud on transactions for an indefinite period.

At 1202, the OSP 598 electronically obtains from a system of an authority entity, a first set of data on which digital rules regarding aspects of a transaction between a first entity and a second entity are based. The OSP 598 may also electronically obtain data regarding the transaction and the OSP 598 may be that of a trusted third entity that is electronically entrusted, by at least the system of the first entity and a system of the authority entity, to validate the data regarding the transaction.

At 1204, the OSP 598 electronically records an entry in a secure electronic ledger which includes the first set of data and a digital signature by the authority entity of the entry which includes the first set of data.

At 1206, the OSP 598 electronically makes all entries in the in the secure electronic ledger associated with the transaction visible by all subscribers of the secure electronic ledger associated with the transaction, including at least the first entity, the trusted third entity and the authority entity.

At 1208, the OSP 598 electronically provides to the subscribers of the secure electronic ledger associated with the transaction, an ability to electronically enter in the secure electronic ledger a rejection of any and all entries in the secure electronic ledger associated with the transaction;

At 1210, the OSP 598 determines whether a rejection of an entry associated with the transaction is received from one or more of the subscribers of the secure electronic ledger associated with the transaction. In response to a determination that a rejection of an entry associated with the transaction is received from one or more of the subscribers of the secure electronic ledger associated with the transaction, the method 1200 proceeds to 1212. In response to a determination that a rejection of an entry associated with the transaction has not been received from one or more of the subscribers of the secure electronic ledger associated with the transaction, the method 1200 proceeds to 1222.

At 1212, the OSP 598 electronically records the corresponding rejection and a respective reason for the corresponding rejection as an entry in the secure electronic ledger electronically signed by a subscriber from which the corresponding rejection was received.

At 1214, the OSP electronically enables the respective reason for the rejection to be viewable in the electronic ledger to the subscribers of the secure electronic ledger associated with the transaction.

At 1216, the OSP 598 determines whether any additional rejections of the entry associated with the transaction have been received from one or more of the subscribers of the secure electronic ledger that are associated with the transaction. In response to a determination that an additional rejection of the entry associated with the transaction has been received from one or more of the subscribers of the secure electronic ledger associated with the transaction, the method 1200 proceeds back to 1212. In response to a determination that that an additional rejection of the entry associated with the transaction has not been received from one or more of the subscribers of the secure electronic ledger associated with the transaction, the method 1200 proceeds to 1218. In some embodiments, there may be a time limit the OSP 598 waits to receive any rejections of the entry in the electronic ledger before proceeding to 1218. The time limit may be selectable by a tax assistance service entity that manages or controls the OSP 598 or other user of the OSP 598, such as one of the subscribers of the secure electronic ledger that are associated with the transaction.

At 1218, the OSP 598 determines whether there is an additional entry associated with the transaction in the secure electronic ledger. In response to a determination that there is an additional entry associated with the transaction in the secure electronic ledger, the method 1200 proceeds back to 1210 to determine whether there has been a rejection of that entry received from one or more subscribers to the secure electronic ledger. In response to a determination that there is not an additional entry associated with the transaction in the secure electronic ledger, the method 1200 proceeds to 1220.

In some embodiments, the OSP 598 may wait to receive an additional entry associated with the transaction based on whether an additional entry is expected according to characteristics of the transactions (e.g., based on whether an expected entry has been received yet indicating an amount of lodging tax collected for a lodging transaction). Also or instead, there may be a time limit the OSP 598 waits to receive any additional entries for the transaction before proceeding to 1220 or determining that there is not an additional entry associated with the transaction in the secure electronic ledger. The time limit may be selectable by a transaction tax assistance service provider entity that manages or controls the OSP 598 or other user of the OSP 598, such as one of the subscribers of the secure electronic ledger that are associated with the transaction.

At 1220, the OSP 598 makes and entry in the secure electronic ledger indicating that the transaction is still pending approval or otherwise records an indication that the transaction is still pending approval. The entry in the secure electronic ledger indicating that the transaction is still pending approval may be made visible by the OSP 598 to all subscribers of the secure electronic ledger associated with the transaction.

At 1222, the OSP makes a determination whether there has been an approval by all the subscribers associated with the transaction of the entries in the secure electronic ledger associated with the transaction. In response to a determination that there has not been an approval by all the subscribers associated with the transaction of the entries in the secure electronic ledger associated with the transaction, the method 1200 proceeds back to 1210. As each approval is received from a subscriber associated with the transaction for an entry in the secure electronic ledger associated with the transaction, the OSP 598 electronically indicates the approval by the subscriber by electronically recording an entry in the secure electronic ledger by the subscriber indicating approval of the entry in the secure electronic ledger associated with the transaction. In response to a determination that there has been an approval by all the subscribers associated with the transaction of the entries in the secure electronic ledger associated with the transaction, the method 1200 proceeds to 12224. In some embodiments, there may be a time limit the OSP 598 waits to receive approval by all the subscribers associated with the transaction of the entries in the secure electronic ledger associated with the transaction before determining there has not been an approval by all the subscribers associated with the transaction of the entries in the secure electronic ledger associated with the transaction. The time limit may be selectable by a transaction tax assistance service provider entity that manages or controls the OSP 598 or other user of the OSP 598, such as one of the subscribers of the secure electronic ledger that are associated with the transaction.

At 1224, the OSP 598 electronically records completion of the transaction as an entry in the secure electronic ledger. Additional actions may be performed by the OSP 598 that are conditional and in response to the recording of completion of the transaction as an entry in the secure electronic ledger. For example, such actions may include, but are not limited to: further processing of the transaction, remitting or initiating remitting of tax payments to a tax authority for the transactions, initiating collection of a tax payment; allowing the transaction to proceed further; electronically releasing or sending funds (e.g., from a trust account) associated with the transaction to one or more subscribers of the electronic ledger; sending a notification of completion to one or more subscribers of the electronic ledger; performing an auditing activity; preparing, filing or sending a tax return document or other report related to the transaction; calculating an amount of a resource; calculating an amount of tax due; indicating that an electronic verification that a correct amount of tax for the transaction is remitted to the tax authority on behalf of the first entity is complete, etc.

Each entry in the secure electronic ledger, such as electronic ledger 170 of FIG. 1 and FIG. 5, may be digitally signed by the entity that made the entry. For example, the OSP 598 may electronically apply the digital signature by the first entity of the entry including the data regarding the transaction by electronically applying a first cryptographic hash, unique to the first entity, of the entry including the data regarding the transaction. The OSP 598 may electronically apply the digital signature by the trusted third entity by electronically applying a second cryptographic hash, unique to the trusted third entity, of the of the entry including the data indicative of validation of the one or more aspects of the data regarding the transaction. The OSP 598 may electronically applying a respective digital signature to each additional entry of the additional entries in the secure electronic ledger by applying a respective digital hash to the additional entry unique to a respective entity that made the additional entry in the secure electronic ledger.

In various example embodiments, the transaction is a taxable transaction for goods or services between the first entity and the second entity; the first entity is the provider of the goods or services; the second entity is the recipient of the goods or services; the resources are monetary amounts; the trusted third entity is a transaction tax assistance service provider; and the authority entity is a tax authority to which taxes related to the transaction are to be remitted. In an example embodiment, one or more aspects of the data regarding the transaction that may comprise content of the entries related to the transaction in the secure electronic ledger include one or more of: a monetary amount of the transaction, an amounts of the goods or services, a characteristic of the goods or services, a characteristic of the first entity, a characteristic of the second entity, an aspect related to licensure of the first entity or second entity; an aspects related to registration of the goods or services; and a source of monetary amounts received by the first entity for the transaction.

In an example embodiment, the method 1200 electronically facilitates the electronic verification that a correct amount of resources are received by respective systems of one or more of the first entity and the authority entity. For example, this may include: electronically facilitating the electronic verification that a correct amount of tax for the transaction is remitted to the tax authority on behalf of the first entity. In some embodiments, this verification is based on and in response to all entries in the secure electronic ledger regarding the transaction being approved, via the secure electronic ledger, by the provider of the goods or services of the transaction, the transaction tax assistance service provider and the tax authority.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:
at least one processor; and
a memory coupled to the at least one processor, the memory storing instructions that, when executed by the at least one processor, cause the system to perform operations including:
electronically obtaining data regarding a relationship instance between a first entity and a second entity, in which the system is a computer system of a trusted third entity that is electronically entrusted, by at least a system of the first entity and a system of an authority entity, to validate the data regarding the relationship instance, in which the system of the authority entity provides a first set of data on which digital rules regarding aspects of the relationship instance are based;
electronically recording an entry in a secure electronic ledger which includes the data regarding the relationship instance and a digital signature by the first entity of the entry including the data regarding the relationship instance;
electronically validating one or more aspects of the data regarding the relationship instance based on the entry in the secure electronic ledger which includes the data regarding the relationship instance;
electronically recording an entry in the secure electronic ledger which includes data indicative of the validation of the one or more aspects of the data regarding the relationship instance and a digital signature by the trusted third entity of the entry including the data indicative of the validation of the one or more aspects of the data regarding the relationship instance, wherein the electronically recording an entry in the secure electronic ledger includes:
receiving, by a service engine, a forwarded push request, the push request carrying a payload from a processor;
applying, by the service engine, stored rules to the received payload to make an entry related to the payload into the secure electronic ledger; and
transmitting, by the service engine, information regarding the entry;
electronically recording additional entries in the secure electronic ledger by one or more of the first entity, the trusted third entity and the authority entity, which include data indicative of whether one or more other entries in the secure electronic ledger regarding the relationship instance are approved by the one or more of the first entity, the trusted third entity and the authority entity; and
electronically facilitating electronic verification that a correct amount of resources are received by respective systems of one or more of the first entity and the authority entity based on the relationship instance and entries in the secure electronic ledger regarding the relationship instance.

2. The system of claim 1, in which the computer-executable instructions, when executed by the at least one processor, further cause the system to perform operations including:
electronically obtaining from the system of the authority entity, the first set of data on which the digital rules regarding aspects of the relationship instance are based; and
electronically recording an entry in the secure electronic ledger which includes the first set of data and a digital signature by the authority entity of the entry which includes the first set of data.

3. The system of claim 2 in which the electronically facilitating electronic verification that a correct amount of resources are received includes:
electronically making all entries in the in the secure electronic ledger associated with the relationship instance visible by all subscribers of the secure electronic ledger associated with the relationship instance, including at least the first entity, the trusted third entity and the authority entity; and
electronically providing, to the subscribers of the secure electronic ledger associated with the relationship instance, an ability to electronically enter in the secure electronic ledger a rejection of any and all entries in the secure electronic ledger associated with the relationship instance.

4. The system of claim 3, in which the computer-executable instructions, when executed by the at least one processor, further cause the system to perform operations including:
receiving from one or more of the subscribers of the secure electronic ledger associated with the relationship instance, one or more corresponding rejections of the entry which includes the data regarding the relationship instance; and
for each of the one or more corresponding rejections:
electronically recording the corresponding rejection and a respective reason for the corresponding rejection as an entry in the secure electronic ledger electronically signed by a subscriber from the corresponding rejection was received; and
electronically enabling the respective reason for the rejection to be viewable in the electronic ledger to the subscribers of the secure electronic ledger associated with the relationship instance.

5. The system of claim 3 in which the electronically facilitating electronic verification that a correct amount of resources are received further includes:
electronically recording completion of the relationship instance as an entry in the secure electronic ledger in which the electronic recording of the completion is conditional on and in response to approval by the subscribers associated with the relationship instance of the entries in the secure electronic ledger associated with the relationship instance.

6. The system of claim 5, in which the computer-executable instructions, when executed by the at least one processor, further cause the system to perform operations including:
electronically indicating the approval by the subscribers associated with the relationship instance by electronically recording entries in the secure electronic ledger by the subscribers associated with the relationship instance indicating approval of the entries in the secure electronic ledger associated with the relationship instance.

7. The system of claim 6 in which the entries in the secure electronic ledger by the subscribers associated with the relationship instance indicating approval are digital signatures by the subscribers associated with the relationship instance of each entry of other subscribers associated with the relationship instance.

8. The system of claim 1 in which the relationship instance is a taxable transaction for goods or services between the first entity and the second entity; the first entity is the provider of the goods or services; the second entity is the recipient of the goods or services; the resources are monetary amounts; the trusted third entity is a transaction tax assistance service provider; the authority entity is a tax authority to which taxes related to the transaction are to be remitted; the one or more aspects of the data regarding the relationship instance include one or more of: a monetary amount of the transaction, an amounts of the goods or services, a characteristic of the goods or services, a characteristic of the first entity, a characteristic of the second entity, an aspect related to licensure of the first entity or second entity; an aspects related to registration of the goods or services; and a source of monetary amounts received by the first entity for the transaction.

9. The system of claim 8 in which the electronically facilitating the electronic verification that a correct amount of resources are received by respective systems of one or more of the first entity and the authority entity includes:
   electronically facilitating the electronic verification that a correct amount of tax for the transaction is remitted to the tax authority on behalf of the first entity based on all entries in the secure electronic ledger regarding the transaction being approved, via the secure electronic ledger, by the provider of the goods or services of the transaction, the transaction tax assistance service provider and the tax authority.

10. The system of claim 1, in which the computer-executable instructions, when executed by the at least one processor, further cause the system to perform operations including:
    electronically obtaining from a system of an intermediary entity that facilitates the relationship instance, additional data regarding the relationship instance; and
    electronically recording an entry in the secure electronic ledger which includes the additional data regarding the relationship instance and a digital signature by the intermediary entity of the entry which includes the additional data regarding the relationship instance.

11. The system of claim 10 in which the additional entries in the secure electronic ledger include one or more electronic entries electronically signed by the intermediary entity regarding the relationship instance and the electronically facilitating the electronic verification that a correct amount of resources are received by respective systems of one or more of the first entity and the authority entity is based on the relationship instance and entries in the secure electronic ledger regarding the relationship instance including the one or more electronic entries electronically signed by the intermediary entity.

12. The system of claim 11, in which the computer-executable instructions, when executed by the at least one processor, further cause the system to perform operations including:
    electronically obtaining from the system of the intermediary entity, a second set of data on which the digital rules regarding aspects of the relationship instance are based; and
    electronically recording an entry in the secure electronic ledger which includes the second set of data and a digital signature by the intermediary entity of the entry which includes the second set of data.

13. The system of claim 1, in which the computer-executable instructions, when executed by the at least one processor, further cause the system to perform operations including:
    electronically applying the digital signature by the first entity of the entry including the data regarding the relationship instance by electronically applying a first cryptographic hash, unique to the first entity, of the entry including the data regarding the relationship instance;
    electronically applying the digital signature by the trusted third entity by electronically applying a second cryptographic hash, unique to the trusted third entity, of the of the entry including the data indicative of the validation of the one or more aspects of the data regarding the relationship instance; and
    electronically applying a respective digital signature to each additional entry of the additional entries in the secure electronic ledger by applying a respective digital hash to the additional entry unique to a respective entity that made the additional entry in the secure electronic ledger.

* * * * *